(12) United States Patent
Bertoni et al.

(10) Patent No.: US 11,077,664 B2
(45) Date of Patent: Aug. 3, 2021

(54) SYSTEMS AND METHODS FOR CONTROLLING THE MORPHOLOGY AND POROSITY OF PRINTED REACTIVE INKS FOR HIGH PRECISION PRINTING

(71) Applicants: Mariana Bertoni, Mesa, AZ (US); April Jeffries, Tempe, AZ (US); Owen Hildreth, Tempe, AZ (US); Avinash Mamidanna, Tempe, AZ (US)

(72) Inventors: Mariana Bertoni, Mesa, AZ (US); April Jeffries, Tempe, AZ (US); Owen Hildreth, Tempe, AZ (US); Avinash Mamidanna, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 16/614,341

(22) PCT Filed: May 17, 2018

(86) PCT No.: PCT/US2018/033277
§ 371 (c)(1),
(2) Date: Nov. 15, 2019

(87) PCT Pub. No.: WO2018/213640
PCT Pub. Date: Nov. 22, 2018

(65) Prior Publication Data
US 2020/0147966 A1 May 14, 2020

Related U.S. Application Data

(60) Provisional application No. 62/507,686, filed on May 17, 2017.

(51) Int. Cl.
*B41J 2/16* (2006.01)
*C08K 3/08* (2006.01)
(Continued)

(52) U.S. Cl.
CPC ............. *B41J 2/1607* (2013.01); *C08K 3/08* (2013.01); *C09D 11/36* (2013.01); *C09D 11/38* (2013.01); *C09D 11/52* (2013.01)

(58) Field of Classification Search
CPC .......... B41J 2/1607; C08K 3/08; C09D 11/36; C09D 11/38; C09D 11/52
See application file for complete search history.

(56) References Cited

U.S. PATENT DOCUMENTS 3,011,920 A 12/1961 Shipley, Jr.
3,762,981 A 10/1973 Blank
(Continued)

FOREIGN PATENT DOCUMENTS

EP 0655317 A1 5/1995
EP 0697282 B1 2/1996
(Continued)

OTHER PUBLICATIONS

Lee et al., "Solution processed aluminum paper for flexible electronics," Langmuir 28, 13127-13135 (2012).
(Continued)

*Primary Examiner* — Jason S Uhlenhake
(74) *Attorney, Agent, or Firm* — Michael Best & Friedrich LLP

(57) ABSTRACT

Systems and methods for optimizing morphology and electrical properties of silver printed on a substrate with a particular implementation in photovoltaic manufacturing techniques. The system comprises a substrate, a printer jet head having a nozzle to dispense a reactive metal ink and a solvent onto the substrate, and wherein the solvent and a temperature of the substrate are controlled during deposition of the reactive metal ink onto the substrate to produce a dense film in the absence of sintering.

21 Claims, 34 Drawing Sheets

(51) Int. Cl.
  *C09D 11/36* (2014.01)
  *C09D 11/38* (2014.01)
  *C09D 11/52* (2014.01)

(56) References Cited

U.S. PATENT DOCUMENTS

| | | | |
|---|---|---|---|
| 4,420,459 A | 12/1983 | Mizuhara | |
| 5,121,329 A | 6/1992 | Crump | |
| 5,268,088 A | 12/1993 | Okabayashi | |
| 5,342,501 A | 8/1994 | Okabayashi | |
| 5,464,707 A | 11/1995 | Moulton et al. | |
| 5,621,449 A | 4/1997 | Leenders et al. | |
| 6,165,406 A | 12/2000 | Jang et al. | |
| 6,637,866 B1 * | 10/2003 | Cornell | B41J 2/14129 347/64 |
| 7,319,528 B2 | 1/2008 | Hidaka | |
| 8,043,535 B2 | 10/2011 | Kamikoriyama et al. | |
| 8,470,231 B1 | 6/2013 | Dikovsky et al. | |
| 8,813,651 B1 | 8/2014 | Hooke | |
| 10,286,713 B2 | 5/2019 | Hildreth et al. | |
| 10,288,638 B2 | 5/2019 | Hildreth et al. | |
| 2003/0128249 A1 | 7/2003 | Booth | |
| 2003/0199162 A1 | 10/2003 | Seki | |
| 2003/0230549 A1 | 12/2003 | Buchanan et al. | |
| 2006/0130700 A1 | 6/2006 | Reinartz | |
| 2010/0021638 A1 | 1/2010 | Varanka et al. | |
| 2011/0035848 A1 | 2/2011 | Perkins et al. | |
| 2011/0036802 A1 | 2/2011 | Ronsin et al. | |
| 2011/0111138 A1 | 5/2011 | McCullough et al. | |
| 2011/0256416 A1 | 10/2011 | Brancher et al. | |
| 2012/0193841 A1 | 8/2012 | Wang et al. | |
| 2013/0075957 A1 | 3/2013 | Swanson et al. | |
| 2013/0126465 A1 | 5/2013 | Hu et al. | |
| 2014/0202595 A1 | 7/2014 | Hofmann | |
| 2014/0257549 A1 | 9/2014 | Swartz et al. | |
| 2015/0004325 A1 * | 1/2015 | Walker | C23C 18/1692 427/469 |
| 2015/0035209 A1 | 2/2015 | Shah et al. | |
| 2015/0037597 A1 | 2/2015 | Kim et al. | |
| 2015/0056319 A1 | 2/2015 | Din et al. | |
| 2015/0197862 A1 | 7/2015 | Engel | |
| 2016/0107234 A1 | 4/2016 | Craeghs et al. | |
| 2016/0199201 A1 | 7/2016 | Weiss et al. | |
| 2017/0146560 A1 | 5/2017 | Hildreth et al. | |
| 2018/0099520 A1 | 4/2018 | Hildreth et al. | |
| 2019/0039137 A1 | 2/2019 | Hildreth et al. | |
| 2019/0314895 A1 | 10/2019 | Hildreth et al. | |

FOREIGN PATENT DOCUMENTS

| | | |
|---|---|---|
| KR | 100359103 B1 | 11/2002 |
| WO | 2012041522 A1 | 4/2012 |
| WO | 2012131481 A1 | 10/2012 |
| WO | 2012162805 A1 | 12/2012 |
| WO | 2014197790 A1 | 12/2014 |

OTHER PUBLICATIONS

Lefky et al., "Dissolvable Supports in Powder Bed Fusion-Printed Stainless Steel," 3D Printing and Additive Manufacturing, vol. 4, No. 1, 2017.
Lefky et al., "Impact of Solvent Selection and Temperature on Porosity and Resistance of Printed Self-Reducing Silver Inks.," Phys. Status Solidi Appl. Mater. Sci., 2016, 1-8.
Li et al., "Conductive copper and nickel lines via reactive inkjet printing," J. Mater. Chem., vol. 19, No. 22, p. 3719, 2009.
Marinkovic, "Contact resistance effects in thin film solar cells and thin film transistors," Jacobs University Thesis, 2013.
McLachlan et al., "Electrical Resistivity of Composites," J. Am. Ceram. Soc., vol. 73, No. 8, pp. 2187-2203, Aug. 1990.
MEGlobal Ethylene Glycol Product Guide http://www.meglobal.biz/media/product_guides/MEGlobal_MEG.pdf (accessed Apr. 10, 2016).
Meier et al., "Contact resistance: Its measurement and relative importance to power loss in a solar cell," IEEE Trans. Electron Devices, vol. 31, No. 5, pp. 647-653, May 1984.
Meier et al., "Inkjetprinted, conductive, 25 uμm wide silver tracks on unstructured polyimide," Phys. Status Solidi Appl. Mater. Sci., vol. 206, No. 7, pp. 1626-1630, 2009.
Mo et al., "Effects of Dodecylamine and Dodecanethiol on the Conductive Properties of Nano-Ag Films." Appl Surf Sci 2011, 257, 5746-5753.
N. R. E. L. NREL, "Best Research-Cell Efficiencies," 2015.
Nie et al., "Inkjet printing of silver citrate conductive ink on PET substrate," Appl. Surf. Sci. 261, 554-560 (2012).
Ningshen et al., "Corrosion behaviour of AlSI type 304L stainless steel in nitric acid media containing oxidizing species," Corrosion Science. 53 (2011) 64-70. doi:10.1016/j.corsci.2010.09.023.
Noor et al., "Corrosion Behavior of Mild Steel in Hydrochloric Acid Solutions," Int J Electrochem Sci 2008, 3, 806.
Perelaer et al., "Printed electronics: the challenges involved in printing devices, interconnects, and contacts based on inorganic materials," J. Mater. Chem., vol. 20, No. 39, p. 8446, 2010.
Pysch et al., "A review and comparison of different methods to determine the series resistance of solar cells," Sol. Energy Mater. Sol. Cells, vol. 91, No. 18, pp. 1698-1706, 2007.
Rasigni et al., "Roughness spectrum and surface plasmons for surfaces of silver, copper, gold, and magnesium deposits," Phys. Rev. B, vol. 27, No. 2, pp. 819-830, Jan. 1983.
Rosen et al., "Printing a Self-Reducing Copper Precursor on 2D and 3D Objects to Yield Copper Patterns with 50% Copper's Bulk Conductivity," Adv. Mater. 2, 1440448 (2015).
Sastry et al., "Anodic Protection of Mild Steel in Nitric Acid," Corrosion. 39 (1983) 55-60. doi:10.5006/1.3580815.
Seikh et al., "Corrosion Behavior in 3.5% NaCl Solutions of γ-TiAl Processed by Electron Beam Melting Process," Metals 2015, vol. 5, pp. 2289-2302. 5 (2015) 2289-2302. doi:10.3390/met5042289.
Semi, "International Technology Roadmap for Photovoltaic 2015 Results," ITRPV, 2015.
Shanmugam et al., "Analysis of Fine-Line Screen and Stencil-Printed Metal Contacts for Silicon Wafer Solar Cells," IEEE J. Photovoltaics, vol. 5, No. 2, pp. 525-533, 2015.
Shapovalov, "Porous Metals.," MRS Bull., vol. 19, No. 04, pp. 24-28, Apr. 1994.
Shin et al., "A Self-Reducible and Alcohol-Soluble Copper-Based Metal-Organic Decomposition Ink for Printed Electronics," ACS Appl. Mater. Interfaces 6, 3312-3319 (2014).
Sinton et al., "A quasi-steady-state open-circuit voltage method for solar cell characterization," Proc. 16th Eur. Photovolt. Sol. Energy Conf, No. May, pp. 1-4, 2000.
Starr et al., "Controlling Phase Composition in Selective Laser Melted Stainless Steels," Power (W) 2012, 439.
Streicher et al., "Pitting Corrosion of 18Cr—8Ni Stainless Steel," J. Electrochem. Soc. 1956, 103, 375-390.
Stull, Vapor Pressure of Pure Substances. Organic and Inorganic Compounds. Ind. Eng. Chem. 1947, 39, 517-540.
Taguchi et al., "Obtaining a higherVoc in HIT cells," Prog. Photovoltaics Res. Appl., vol. 13, No. 6, pp. 481-488, Sep. 2005.
Talbot et al., "Control of the Particle Distribution in Inkjet Printing through an Evaporation-Driven Sol-Gel Transition," ACS Appl. Mater. Interf. 6, 9572-9583 (2014).
Talbot et al., "Evaporation of Picoliter Droplets on Surfaces with a Range of Wettabilities and Thermal Conductivities," Physical Review E, 2012, 85, 061604.
"Tao et al., "A facile approach to a silver conductive ink with high performance formacroelectronics," Nanoscale Res. Lett., vol. 8, No. 1, pp. 1-6, 2013."
The Silver, Glistening Particles of Industrial Silver, https://www.Silverinstitute.orgsitewpcontentuploadsGPISDec.pdf (accessed Dec. 20, 2016).
Topsoe, Semiconductor Division, Geometric Factors in Four Point Resistivity Measurement, 2nd edn. (1968). Available from download at Bridge Technology's web site, http://www.four-point-probes.com/haldor.html.

(56) References Cited

OTHER PUBLICATIONS

Turpin et al., "Carbon diffusion and phase transformations during gas carburizing of high-alloyed stainless steels: Experimental study and theoretical modeling," Metall and Mat Trans A. 36 (2005) 2751-2760. doi:10.1007/s11661-005-0271-4.

Valeton et al., "Room temperature preparation of conductive silver features using spin-coating and inkjet printing ," J. Mater. Chem. 20, 543-546 (2010).

Vanýsek, "Impact of electrode geometry, depth of immersion, and size on impedance measurements," Canadian Journal of Chemistry, 1997, 75, 1635-1642.

Walker et al., "Reactive silver inks for patterning high-conductivity features at mild temperatures," J. Am. Chem. Soc., vol. 134, No. 3, pp. 1419-1421, 2012.

Wang et al., "Research on the fabricating quality optimization of the overhanging surface in SLM process," Int J Adv Manuf Technol. 65 (2013) 1471-1484. doi:10.1007/s00170-012-4271-4.

Wilke et al., Estimation of Diffusion Coefficients for Gases and Vapors. Ind. Eng. Chem. 1955, 47, 1253-1257.

Wolf et al., "Series resistance effects on solar cell measurements," Adv. Energy Conyers., vol. 3, No. 2, pp. 455-479, 1963.

Zenou, M. et al., "Printing of metallic 3D micro-objects by laser induced forward transfer", Optics Express, Jan. 2016, vol. 24, No. 2, pp. 1431-1446 <DOI:10.1364/OE.24.001431>.

Zhang et al., "Reference and counter electrode positions affect electrochemical characterization of bioanodes in different bioelectrochemical systems," Biotechnology and Bioengineering 2014, 111(10): 1931-1939.

Aberle et al., "Series Resistance of Solar Cells," in Photovoltaic Specialist Conference, 1993., IEEE, 1993, pp. 133-139.

Ambrose et al., "Thermodynamic properties of organic oxygen compounds. Part IX. The critical properties and vapour pressures, above five atmospheres, of six aliphatic alcohols ," J.Chem.Soc., 3614-3625 (1963).

An et al., "High-Resolution Printing of 3D Structure Using an Electrohydrodynamic Inkjet with Multiple Functional Inks," Jun. 19, 2015, Adv. Mater. 2015, 27, 4322-4328, Wiley-VCH.

Bidoki et al., "Ink-Jet Fabrication of Electronic Components." J. Micromech. Microeng. 2007, 17, 967-974.

Chien et al., "Metallization optimization for high efficiency silicon heterojunction solar cells using low-temperature paste screen printing," 39th IEEE Photovoltaics Spec. Conf., 2013.

Cunningham et al., "Measurement of the correlation between the specular reflectance and surface roughness of Ag films," Phys. Rev. B, vol. 14, No. 2, pp. 479-483, Jul. 1976.

Dai et al., "Corrosion behavior of selective laser melted Ti—6Al—4V alloy in NaCl solution," Corrosion Science. 102 (2016) 484-489. doi:10.1016/j.corsci.2015.10.041.

De Minjer et al., "The Nucleation with SnCl[Sub 2]-PdCl[Sub 2] Solutions of Glass Before Electroless Plating." J Electrochem Soc 1973, 120, 1644.

De Wolf et al., "High-efficiency Silicon Heterojunction Solar Cells : A Review," vol. 2, pp. 7-24, 2012.

De Wolf et al., "Nature of doped a-Si:H/c-Siinterface recombination," J. Appl. Phys., vol. 105, 2009.

Deakin et al., "De-alloying of type 316 stainless steel in hot, concentrated sodium hydroxide solution," Corrosion Science. 46 (2004) 2117-2133. doi:10.1016/j.corsci.2004.01.011.

Demaurex et al., "Damage at hydrogenated amorphous/crystalline silicon interfaces by indium tin oxide overlayer sputtering," Appl. Phys. Lett., vol. 101, No. 17, p. 171604, 2012.

Deng et al., "Copper carboxylate with different carbon chain lengths as metal-organic decomposition ink," J. Mater. Sci.: Mater. Electron. 25, 390-397 (2013).

Dillon et al., "Fundamental Equation for Calculation of the Thermodynamic Properties of Ethanol," International Journal of Thermophysics, vol. 25, No. 2, 2004, 32.

Dinwiddie, R. et al., "Real-time process monitoring and temperature mapping of a 3D polymer printing process", SPIE Defense, Security, and Sensing (Baltimore, MD, May 22, 2013), 2013, vol. 8705, article 87050L, 10 pages <DOI:10.1117/12.1518454>.

Disclosed Anonymously., "Dissolvable Metal-Polymer Composite Parts" [online], IP.com Prior Art Database Technical Disclosure, Apr. 2015 [obtained on Sep. 26, 2019 from ip.com], retrieved from the internet: <https://priorart.ip.com/IPCOM/000241271>.

Domonoky, BonsiBrain, Support—Full Disclosure, Httpifeelbeta. Deindex.Phpsupportsupport-Full-Disclosure. (2010). http://ifeelbeta.de/index.php/support/support-full-disclosure (accessed Feb. 2, 2016).

Epstein et al., "Cathodic corrosion of stainless steel in nitric acid," Corrosion Science. 5 (1965) 461-470. doi:10.1016/S0010-938X(65)80051-8.

European Patent Office Extended Search Report for Application No. 17753793.3 dated Sep. 13, 2019 (8 pages).

European Patent Office Extended Search Report for Application No. 17828087.1 dated Feb. 10, 2020 (8 pages).

Evans, "Behaviour of metals in nitric acid," T Faraday Soc. 40 (1944) 120-130. doi:10.1039/TF9444000120.

Farraj et al., "Self-Reduction of a Copper Complex MOD Ink for Inkjet Printing Conductive Patterns on Plastics." Chem Commun 2015, 51, 1587-1590.

Galwey et al., "Thermal decomposition of three crystalline modifications of anhydrous copper(II) formate," J. Phys. Chem., 78, 2664-2670 (1974).

Griffith et al., "Multi-material processing by LENS," Solid Freeform Fabrication Proceedings. (1997) 387-394. doi:10.1.1.476.3973.

GSI Chemical Database http://gsi-net.com/en/publications/gsi-chemical-database/single/276.html (accessed Apr. 10, 2016).

Hannebauer et al., "18.9%-efficient screen-printed solar cells applying a print-on-print process," in Proc. 16th European Photovoltaic Solar Energy Conf, 2011, pp. 5-9.

Hermans et al., "Advanced Metallization Concepts by Inkjet Printing," in 29th European Photovoltaic Solar Energy Conference and Exhibition, 2014, pp. 518-522.

Hildreth et al., "Dissolvable Metal Supports for 3D Direct Metal Printing," 3D Printing and Additive Manufacturing. 3 (2016) 90-97. doi:10.1089/3dp.2016.0013.

Hock, "Inkjet Printing Gone Solar," R & D Magazine, Aug. 2015.

International Preliminary Report on Patentability for Application No. PCT/US2017/018084 dated Aug. 30, 2018 (9 pages).

International Preliminary Report on Patentability for Application No. PCT/US2017/018096 dated Aug. 30, 2018 (6 pages).

International Preliminary Report on Patentability for Application No. PCT/US2017/018104 dated Jan. 24, 2019 (9 pages).

International Preliminary Report on Patentability for Application No. PCT/US2018/033277 dated Nov. 28, 2019 (9 pages).

International Search Report and Written Opinion for Application No. PCT/US2017/018084 dated Jun. 1, 2017, 10 pages.

International Search Report and Written Opinion for Application No. PCT/US2017/018096 dated May 15, 2017, 7 pages.

International Search Report and Written Opinion for Application No. PCT/US2017/018104 dated Jun. 1, 2017, 10 pages.

International Search Report and WrittenOpinion for Application No. PCT/US2018/33277 dated Aug. 8, 2018, 13 pages.

Jahn et al., "Inkjet printing of conductive silver patterns by using the first aqueous particle-free MOD ink without additional stabilizing ligands," Chem. Mater 22, 3067-3071 (2010).

Jeffries et al., "Reactive silver ink as front contacts for high efficiency silicon heterojunction solar cells," 2016 IEEE 43rd Photovoltaic Specialists Conference (PVSC).

Johannes et al., "Letting Corrosion Work for You: Novel Pathways to Additive Manufacturing and Nanomaterial Synthesis Using Electrochemically-Driven Powder Consolidation," Advanced Engineering Materials. 16 (2014) 1147-1159. doi:10.1002/adem.201300562.

Jones et al., Physical Properties of Ethylene Glycol—Google Scholar; Glycols. G. 0. Curme, 1952.

Kauffman et al., "Prediction of Surface Tension, Viscosity, and Thermal Conductivity for Common Organic Solvents Using Quantitative Structure-Property Relationships," J. Chem. Inf. Comput. Sci. 41, 408-418 (2001).

(56) References Cited

OTHER PUBLICATIONS

Kikuchi et al., "Measurement of the adhesion of silver films to glass substrates," Thin Solid Films 124, 343-349 (1985).

Kim et al., "Investigation of the sensitization and intergranular corrosion of tube-to-tubesheet welds of hyper duplex stainless steel using an electrochemical reactivation method," Corrosion Science. 87 (2014) 60-70. doi:10.1016/j.corsci.2014.06.005.

Kim et al., "Nonlinear optical transitions of GaAs/AlGaAs GaAs/AlGaAs asymmetric double-well structures," Applied Physics Letters, 89, 1-3 (2006).

King et al., "Ultrasound Atomic Force Microscopy: Atomic-Scale Stability and Registration in Ambient Conditions," Nano Letters, Jan. 27, 2009, vol. 9, No. 4, 1451-1456, American Chemical Society 2009.

Kolman et al., "Corrosion of 304 stainless steel exposed to nitric acid-chloride environments," Corrosion Science. 39 (1997) 2067-2093. doi:10.1016/S0010-938X(97)00092-9.

Laleh et al., "Suppression of chromium depletion and sensitization in austenitic stainless steel by surface mechanical attrition treatment," Mater Lett. 65 (2011) 1935-1937. doi:10.1016/j.matlet.2011.03.055.

Lee et al., "A Novel Solution—Stamping Process for Preparation of a Highly Conductive Aluminum Thin Film." Adv. Mater. 2011, 23, 5524-5528.

Lee et al., "Long-Term Sustainable Aluminum Precursor Solution for Highly Conductive Thin Films on Rigid and Flexible Substrates." ACS Appl. Mater. Interfaces 2014, 6, 15480-15487.

European Patent Office Examination Report for Application No. 17753793.3 dated May 28, 2020 (7 pages).

* cited by examiner

| | $V_{oc}$ (mV) | $J_{sc}$ (mA/cm$^2$) | pFF (%) | FF (%) | $R_s$ (Ω·cm$^2$) | η (%) |
|---|---|---|---|---|---|---|
| SP Paste Cell | 713 | 35.9 | 81.3 | 76.3 | 1.1 | 19.5 |
| DoD-RSI Cell | 712 | 35.5 | 80.9 | 72.9 | 1.8 | 18.4 |

*FIG. 23*

22°C  1:9 - BD:Ag Ink        1:1 - BD:Ag Ink        1:1 - EtOH:Ag Ink       10:1 - EtOH:Ag Ink

No Samples at              No Samples at
22 °C                      22 °C

SYSTEMS AND METHODS FOR CONTROLLING THE MORPHOLOGY AND POROSITY OF PRINTED REACTIVE INKS FOR HIGH PRECISION PRINTING

CROSS-REFERENCE TO RELATED APPLICATION(S)

This application is a PCT international application and claims the benefit of U.S. Provisional Patent Application No. 62/507,686, filed on May 17, 2017, the entire contents of which are incorporated herein by reference.

BACKGROUND OF THE INVENTION

The processes currently used to manufacture photovoltaic devices are suitable to achieve a minimum sustainable price, but low profit margins and high capital expenditures on numerous pieces of equipment severely limit the growth capacity, while also preventing introduction of newer innovative technologies into the market.

Approximately 2 Mkg of silver ink and pastes are consumed each year. While the vast majority of this silver is consumed as silver paste to metalize photovoltaic panels, there is substantial interest in drop-on demand (DoD) printable silver inks for low-cost electronics fabrication and rapid prototyping of electronic circuits. Most commercially available DoD silver inks are particle-based, consisting of a colloidal suspension of silver particles or nanoparticles dispersed in a fluid containing solvents, humectants, and other chemicals to aid in stabilization, dispersion, and sintering. These inks work reasonably well, with newer nanoparticle inks showing good electrical conductivity with low, sub −100° C. sintering temperatures. However, adoption of particle-based inks is still restricted by their high costs, limited commercial availability, and difficulties with nozzle clogging. Organometallic inks have been widely researched as a method to bypass some of the challenges with particle-based inks by printing chemical precursors that, once printed, react to form solid metals. These inks, also called metal-organic complex inks, self-reducing inks, or reactive inks, consist of dissolved metal salts, chelating agents, and reducing agents along solvents that adjust viscosity, evaporation rate, and surface tension for DoD droplet stabilization.

Reactive inks can be easier to synthesize than nanoparticle inks (as exampled by the silver diamine ink exampled by Walker et al.) and bypass the oxidation issues that often degrade metallic particle-based inks (as exampled by the copper reactive ink demonstrated by Rosen et al.). Despite these advantages, reactive inks have seen very little adoption beyond the research community because, until recently, most reactive inks required high temperatures to initiate the metal complex reduction reaction. These higher temperatures negated the benefits of reactive inks and limited the types of substrates they could be printed on.

SUMMARY OF THE INVENTION

The present invention relates to systems and methods for the morphological control of reactive inks for high precision printing and a particular implementation in photovoltaic manufacturing techniques. More particularly, DoD printing can act as a disruptive technology for solar cell technologies. DoD printing offers a low-cost, high performance alternative to traditional methods used in the manufacturing and processing of silicon solar cell technologies. A single DoD printer can carry out numerous tasks replacing the need to purchase equipment, resulting in significant reductions in capital expenditures with higher maximum sustainable growth rates and profit margins. DoD printing offers precise placement of materials with minimum waste, and good alignment without contact. This invention disclosure details a controllable approach for patterning dopants/seed layers and etching grooves at different scales in a cost efficient manner.

In one embodiment, the present invention provides a system for printing metal on a substrate. The system comprises a substrate, a printer jet head having a nozzle to dispense a reactive metal ink and a solvent onto the substrate, and wherein the solvent and a temperature of the substrate are controlled during deposition of the reactive metal ink onto the substrate to produce a dense film in the absence of sintering.

In another embodiment, the invention provides a system of optimizing morphology and electrical properties of silver printed on a substrate. The system comprises a printer jet head having a nozzle to dispense reactive metal ink and solvent droplets onto the substrate to produce a dense film in the absence of sintering. A temperature of the substrate is maintained between about 60° C. and about 80° C. during deposition of the reactive metal ink onto the substrate. A contact angle of a dispensed droplet relative to the substrate is less than 15° and a concentration of the solvent to reactive metal ink ranges between 1:1 and 10:1, such that the dense film provides media resistivity less than 2 $\mu\Omega$cm and an optimized morphology of low porosity.

In various embodiments, the invention provides methods and systems that utilize dispensing printing for patterning of surfaces and materials, applicable to solar cell technologies. Patterning of surfaces can be performed using various different techniques depending on the end goal for which the patterning is done including, for example, the removal or deposition of materials designed/selected specifically for electronics, clinical, or biological applications. Some specific techniques for selective patterning of solar cell technologies may include, for example, photolithography, soft lithography, laser processing, screen printing, aerosol printing, and inkjet printing. Each of these existing techniques has limitations in achieving high quality results while also having low capital expenditure and waste, industrial scalability, and process simplicity. The challenge of patterning surfaces of solar cell technologies can be exemplified by plated contacts. Some manufacturing techniques for electroplated contacts, electroless-plated contacts, and light-induced-plated contacts require multi-step, complex and costly patterning processes that often require micron-scale alignment from one step to the next. Solar cell technologies beyond plated contacts can also be improved by more cost efficient, simplified processes through high precision patterning, resulting in reduced capital expenditure.

In some embodiments, the invention provides methods and systems for selective patterning techniques that use high precision dispensing printing to: (i) directly remove a patterned region of a material; (ii) selectively pattern a region to be doped directly below where the contacts will be formed, (iii) directly selectively pattern a seed layer for subsequent deposition of contacts (i.e., plated contact), and/or (iv) isolate edges to prevent shunting.

In one embodiment, the invention provides a method for selectively patterning a solar cell device using high precision dispensing printing to directly remove a patterned region of a material. Grooves are opened/patterned in a dielectric/oxide layer with a chemical etchant where the chemistry of the etchant is adjusted to modify the surface tension and wetting of the droplets. In some embodiments, masks are used to control the flow of the etchant. In some embodiments, the mask/masking layer is formed from dispensing printing while, in other embodiments, the masking layer is deposited and openings in the mask are formed from dispensing printing of a selective etchant.

In another embodiment, the invention provides a method for selectively patterning a solar cell device using high precision dispensing printing to selectively pattern a region to be doped directly below where contacts will be formed. In some embodiments, the method includes direct removal of a patterned region of a material coupled with subsequent printing of well-controlled precise features to disperse a dopant source to form, for example, a selective emitter. In other embodiments, dispensing printing techniques are used to directly selectively pattern a seed layer for subsequent deposition of contacts (e.g., plated contact) without directly removing a patterned region of the material. In some embodiments, the printed dopant source can be formed from a commercially available spin-on-dopant, where the chemistry of the spin-on-dopant can be adjusted to modify the surface tension and wetting of the droplets. In some embodiments, masks are used (e.g., masks formed from dispensing printing of resists) to control the flow of inks. Subsequent annealing of the printed dopant source may, in some implementations, be annealed thermally (with, for example, a furnace or a hot plate) or a thermally (e.g., with a laser or using electromagnetic induction.

In yet another embodiment, the invention provides a method for selectively patterning a solar cell device using high precision dispensing printing to directly selectively pattern a seed layer for subsequent deposition of contacts (i.e., plated contacts). The patterning of the seed layer can include, in some embodiments, direct removal of a patterned region from a material and/or selectively patterning of a regions to be doped directly below where the contacts will be formed, coupled with subsequent printing of well-controlled, precise features to form a seed layer or metallization layer. The printed seed or metallization layer may be formed, for example, from reactive inks or particle-based inks. The chemistry of the inks may be adjusted to modify the surface tension and wetting of the droplets, and masks may be used to control the flow of the inks.

In another embodiment, the invention provides a method for selectively dispensing the reactive inks onto the polymeric encapsulants commonly used for solar cell encapsulation (PET, TPO, EVA, Ionomers, etc) without the need for printing on the cells. Electrical contact is ensured by contacting the polymer and the cells through the process of encapsulation. The chemistry of the inks may be adjusted to modify the surface tension and wetting of the droplets, and masks may be used to control the flow of the inks on the polymeric substrates.

In still another embodiment, the invention provides a method for selectively patterning a solar cell device using high precision printing to isolate edges to prevent shunting. In some embodiments, precise edge isolation to isolate shunts is performed subsequent to directly removing a patterned region of a material, selectively patterning a region to be doped directly below where contacts will be formed, and/or directly selectively patterning a seed layer for subsequent deposition of contacts. The edge isolation can be achieved through etching a groove near an edge of a wafer where, in some embodiments, the groove can act as the edge isolation and, in other embodiments, the groove can acts as a cleave line to completely remove the edges from the wafer.

The chemistry of the etchant may be adjusted to modify the surface tension and wetting of the droplets, and masks may be used to control the flow of the etchants.

Other aspects of the invention will become apparent by consideration of the detailed description and accompanying drawings.

BRIEF DESCRIPTION OF THE DRAWINGS

FIG. 23 is a table of electrical characteristics for the SHJ solar cells of FIGS. 19 and 20.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are hereby incorporated by reference in their entirety. The materials, methods, and examples disclosed herein are illustrative only and not intended to be limiting.

For the recitation of numeric ranges herein, each intervening number therebetween with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

"About" is used synonymously herein with the term "approximately." Illustratively, the use of the term "about" indicates that values slightly outside the cited values, namely, plus or minus 10%. Such values are thus encompassed by the scope of the claims reciting the terms "about" and "approximately."

Figure 25:
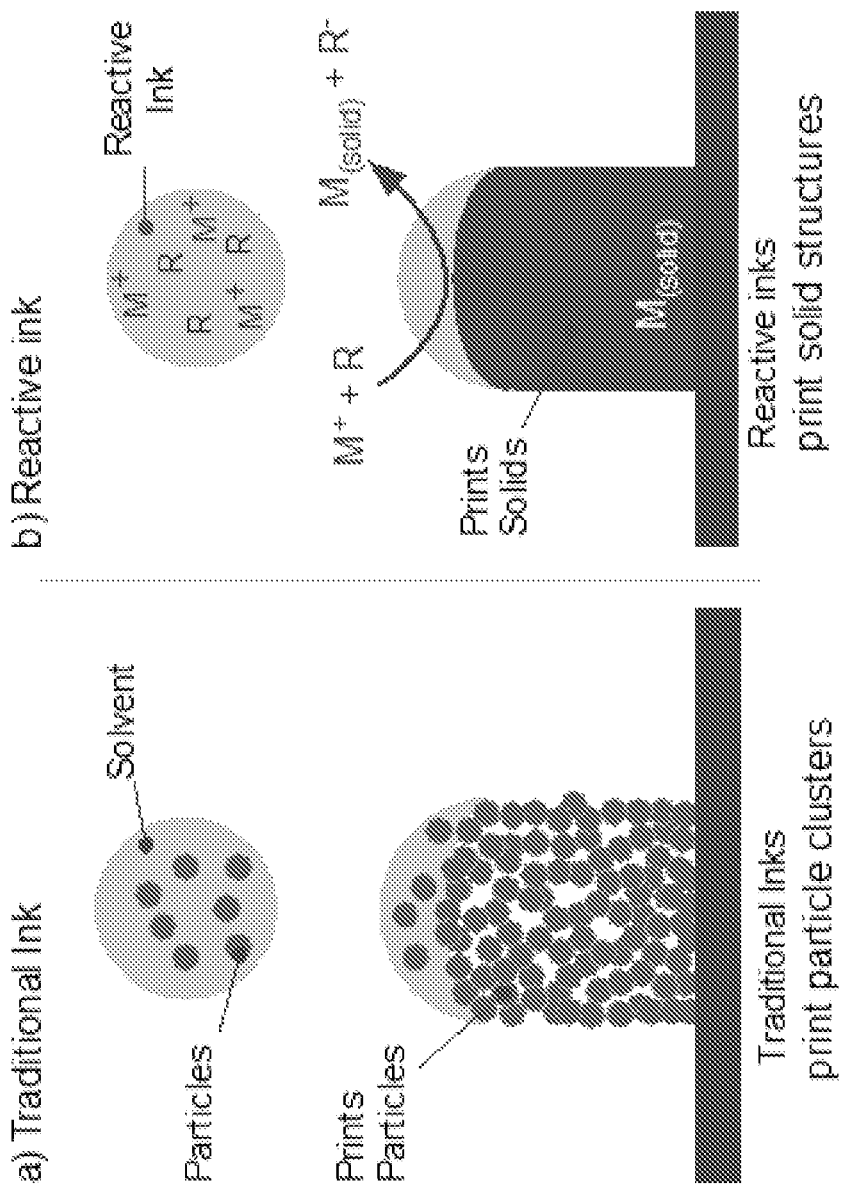
FIG. 25 is a schematic showing the difference between traditional, particle-based inks and reactive inks.

As discussed in further detail below, dispensing-type printing techniques (e.g., drop-on-demand (DoD), inkjet printing, etc.) can be adapted and utilized for manufacturing processes using, for example, reactive inks. The performance of the devices that are manufactured using dispensing printing techniques (e.g., photovoltaic cells and printed electronics) can be improved and adjusted by controlling the morphology and porosity of printed reactive inks. Unlike traditional, particle-based inks that effectively print clusters of particles, reactive inks print chemical reactions that, if properly designed, result in high quality materials at low temperatures. See FIG. 25 for a schematic showing the difference between traditional, particle-based inks and reactive inks. The application of these reactive inks into functional devices can be further specified by balancing chemical kinetics, mass transport, and heat transport so that the desired material properties can be achieved within the design constraints of the device.

Various examples are presented herein of ink compositions and parameters that produce high-quality reactive ink films with low porosity and good electrical properties. Specifically, the processing parameters can be adjusted to induce preferential nucleation at the substrate surface so that bottom-up growth is preferred over other growth modes. The morphology and resulting material properties are controlled by controlling the ink composition and processing parameters. In particular, in various implementations, the morphology and porosity of "printed" material can be adjusted (i.e., forming a more dense film/"printed" trace/patterned surface) by increasing the substrate temperature, decreasing the volume of droplets dispensed by the printing process, and/or decreasing the contact angle of the dispensed droplet relative to the substrate. In some implementations, the ink composition and substrate surface energy are adjusted to reduce the contact angle to less than 15 degrees, the metal salt concentration is adjusted to below 1 mole/liter, and reduction kinetics are designed to favor thermally-induced reduction above room temperature over chemically-induced reduction at room temperature (or below).

Example reactive inks include: silver-diamine inks, copper formate complexed with 2-amino-2-methyl-1-propanol (CuF-AMP), and more. For example, silver diamine inks may include silver acetate dissolved in ammonium hydroxide with formic acid as a reducing agent. This ink composition is driven by the reduction of a diaminesilver (I) complex stabilized by excess ammonia (≥4:1 ratio). The diaminesilver complex is formed as follows:

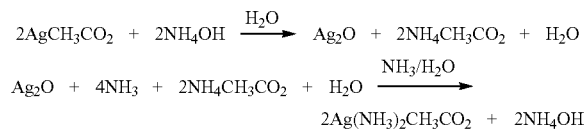

The ink contains diaminesilver (I) cations, acetate anions, and formate anions and is stable at room temperature as long as an excess of ammonia is present in solution. The excess ammonia evaporates once printed, triggering the reduction of the silver diamine to silver and silver acetate:

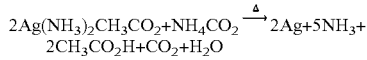

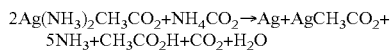

This example of a reactive ink reaction is driven by the evolution of the ammonia through the reaction.

Figure 1:
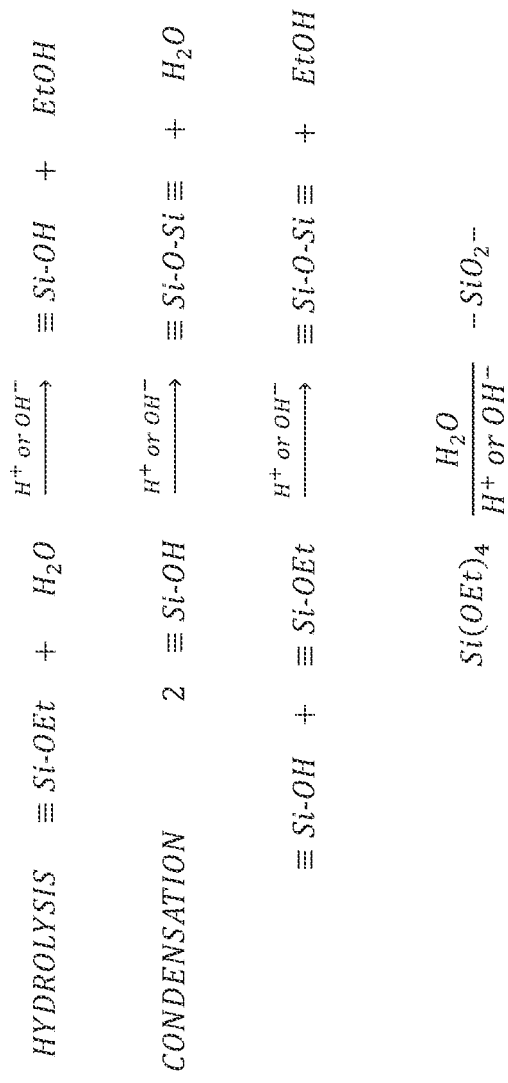
FIG. 1 is an example of a hydrolysis reaction for printed $SiO_2$ reactive inks.
Figure 2:
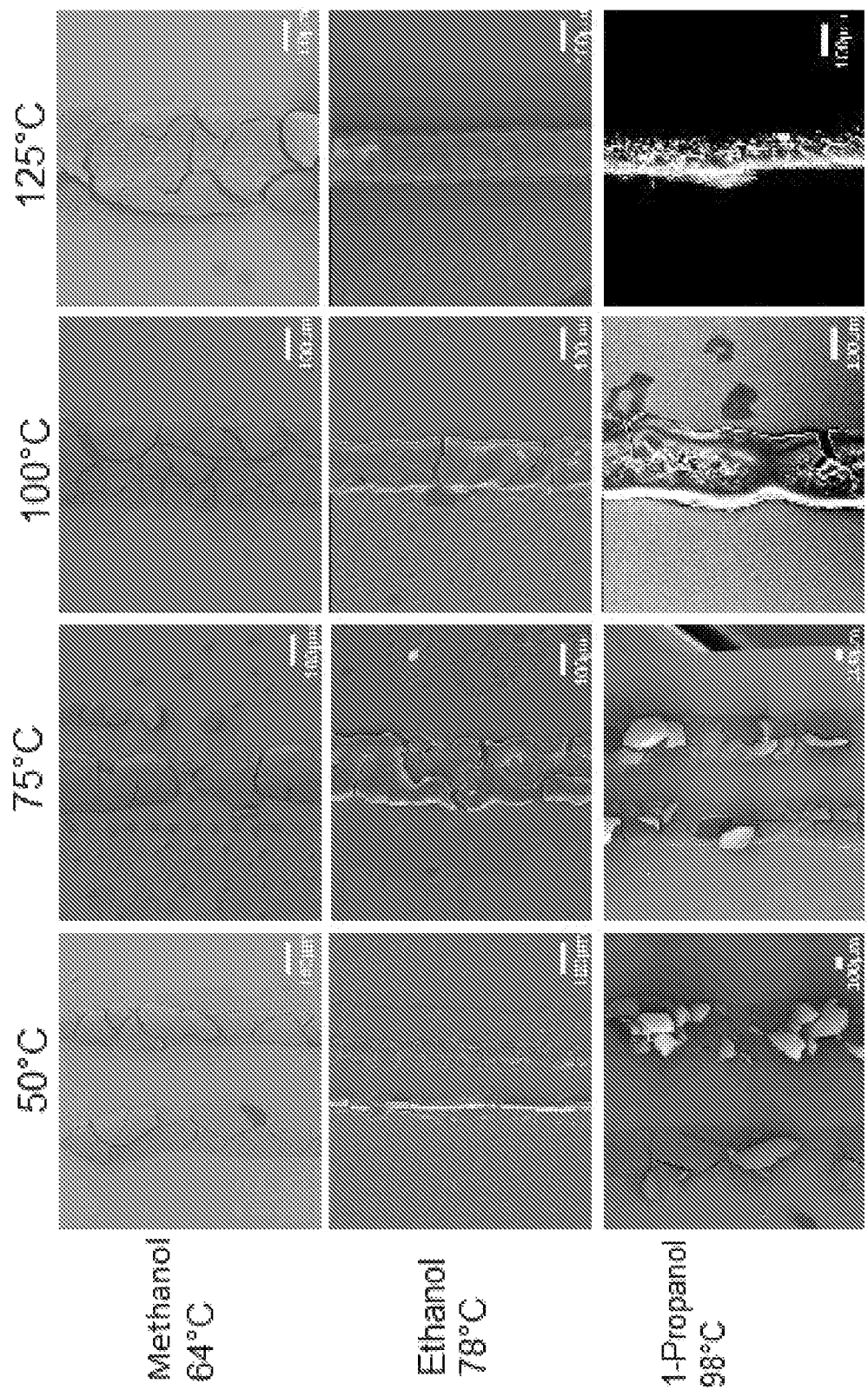
FIG. 2 is a series of top view SEM images of samples printed using methanol, ethanol, and 1-propanol at different temperatures.
Figure 3:
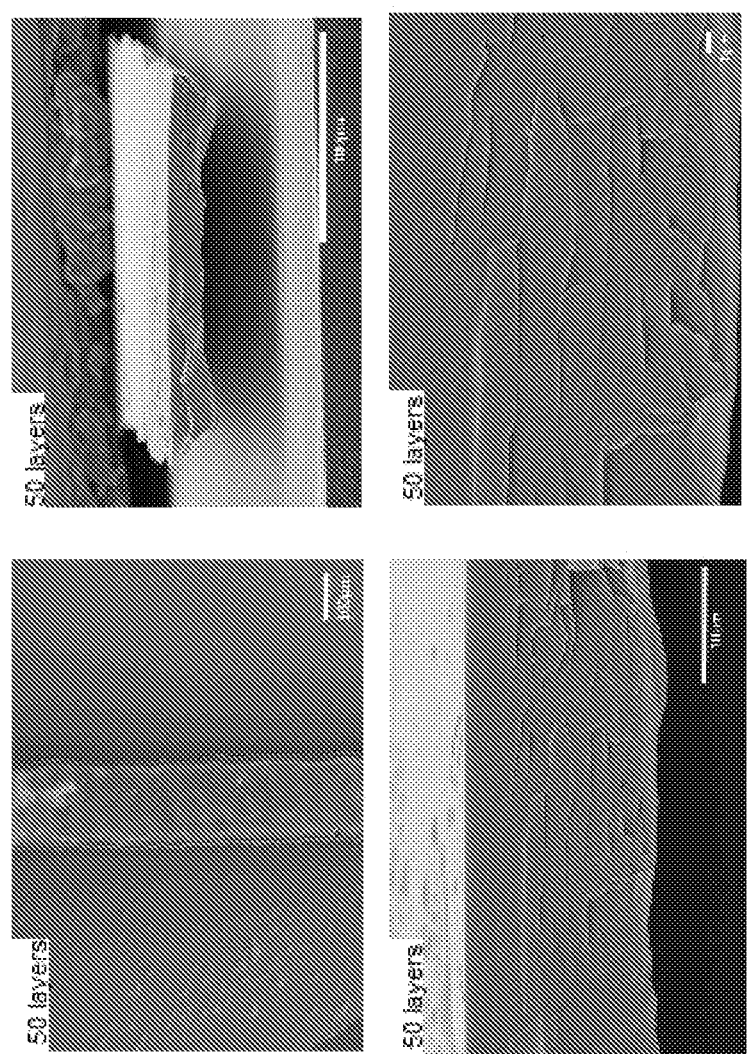
FIG. 3 is a top view and cross-sectional view of printed lines using ethanol diluted reactive ink at 125 degrees C.

Example of $SiO_2$ reactive inks are shown in FIG. 1. In short, a solution of Tetraethyl orthosilicate (TEOS) and HCl is diluted in ethanol and immediately printed onto a hot substrate. This is an important difference between TEOS-based sol-gel inks that print nanoparticles. By printing immediately after the ink is mixed the hydrolysis reaction occurs at the substrate/ink interface where the temperature is the highest and the $SiO_2$ grows from the bottom up. When printing processes are optimized, the resulting film is dense and solid with low porosity. The impacts of processing conditions on morphology are shown in FIGS. 2 and 3 with FIG. 3 showing that a 100% dense film with 0% porosity is possible. This type of reactive ink shows a hydrolysis driven reaction that can be forced into a thermally driven reaction by adjusting the hydrolysis speed.

In particular, FIG. 2 shows a series of top-view SEM images of samples printed using methanol, ethanol, and 1-propanol at different temperatures (i.e., 50 degrees C., 75 degrees C., 100 degrees C., and 125 degrees C.). FIG. 2 shows that the width of the lines decreases with the increasing of temperature. FIG. 3 shows a top view and cross-section view of printed lines using ethanol diluted reactive ink at 125 degrees C. Solid layer-by-layer structures are observed in high magnification images.

Figure 4:
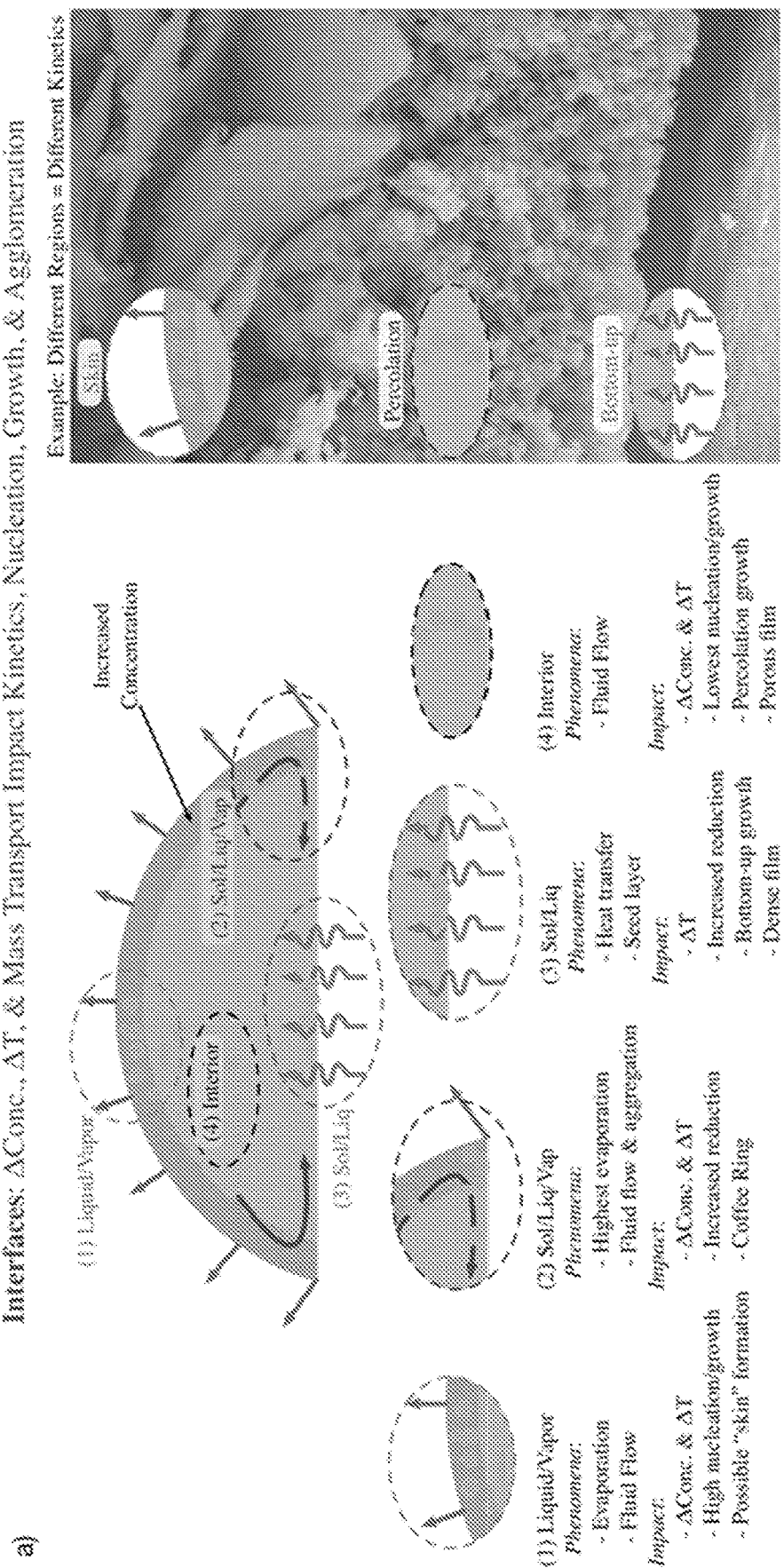
FIG. 4 is a schematic diagram of how different interfaces within an evaporating droplet of reactive ink have different chemical and thermal environments.
Figure 5:
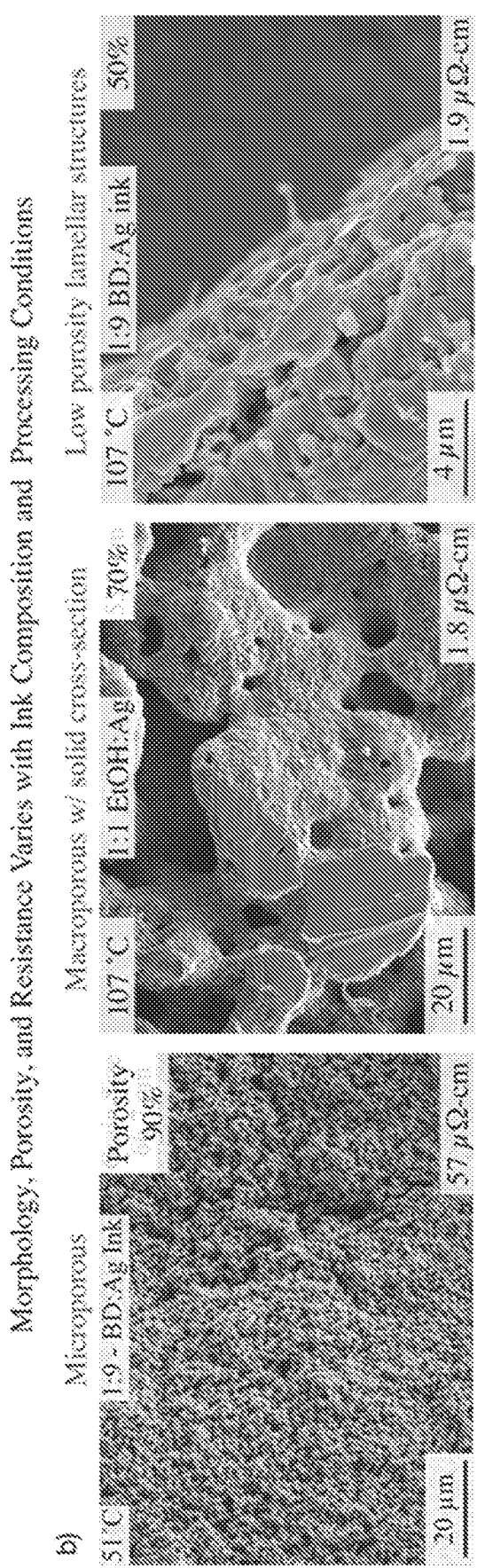
FIG. 5 is a series of SEM images of example variations in porosity and morphology.
Figure 6:
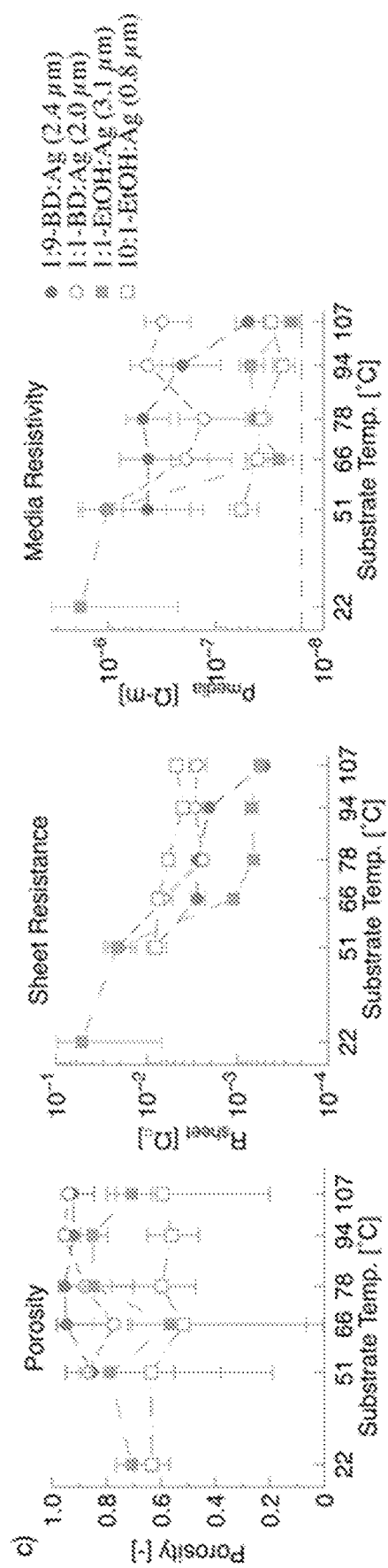
FIG. 6 is a series of graphs of porosity and electrical properties relative to changes in processing parameters.

FIG. 4 illustrates how different interfaces within an evaporating droplet of reactive ink have different chemical and thermal environments. This leads to variations in particle nucleation and growth rate distributions and impacts the morphology of the printed reactive inks. FIG. 5 shows a series of SEM images of example variations in porosity and morphology. FIG. 6 shows the impact of processing parameters on porosity and electrical properties.

In order to print high quality, dense films with low porosity and good material properties it is important to balance reaction kinetics with mass transport and heat transfer. The reaction kinetics should be fast enough and concentration low enough such that the reaction goes to completion by the time the droplet completely evaporates. However, the reduction kinetics should not be so fast that the reaction occurs throughout the droplet, instead, the kinetics must be designed such that the reaction occurs preferentially at the substrate. This can be accomplished by tuning the reaction kinetics to be thermally active (as exampled by the TEOS). Additionally, the contact angle between the printed reactive ink droplet should be less than 10° to reduce internal droplet flow and reduce the temperature drop between the substrate and the liquid/vapor interface. The temperature of the substrate should be tuned to balance reduction rate (want as high as possible) while still maintaining the reaction primarily at the substrate.

Dispensing printing processes—such as, for example, dispensing reactive silver inks (RSI)—are low cost, low-waste, have low-thermal budget, and enable formation of highly conductive metallization schemes on temperature sensitive devices. Since reactive inks print a chemical reaction, it is also expandable to other metals such as Cu, Al, Ni, and more. Additionally, other advanced metallization concepts can be improved by use of dispensing RSI. For example, as discussed below in reference to FIG. 12, dispensing RSI can be used as seed layers for patterning of micron-scale electroplated contacts which often suffer from complicated processing challenges in order to pattern the front metallization.

Figure 7:
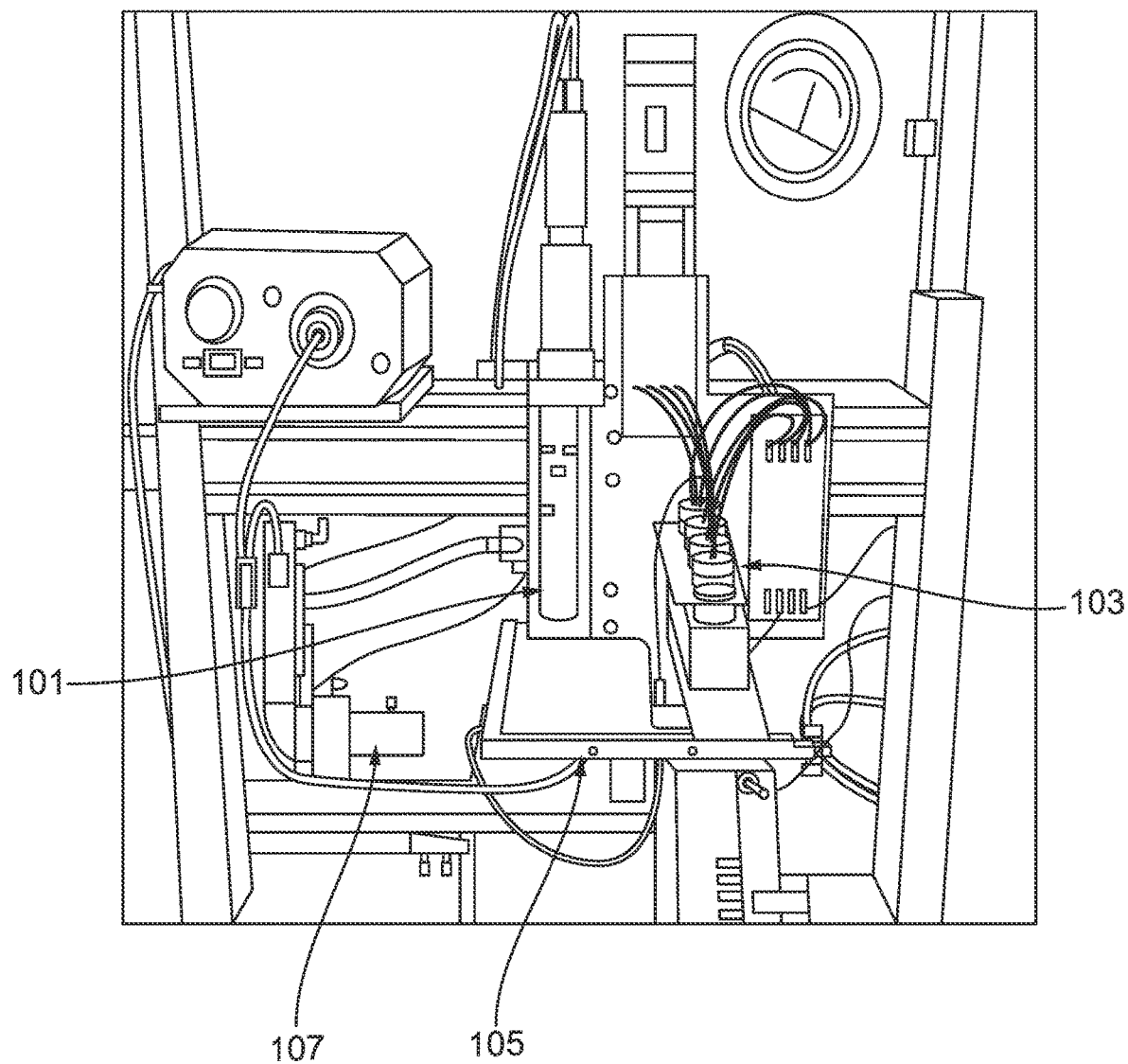
FIG. 7 is an elevation view of a dispensing printing system according to one embodiment.

FIG. 7 illustrates an example of a dispensing printing system. The system in this example is a Microfab Jetlab II drop-on-demand (DoD) printing system. However, in other implementations, other printing systems and other dispensing printing techniques may be utilized. The system in this particular example includes a jetting head 101 with a 60 μm nozzle orifice coated with a diamond-like coating to reduce wetting. A fluid material (e.g., a reactive silver ink, an etchant, a dopant, etc.) is dispensed from the ink reservoir 103 through the jetting head 101 and onto a substrate positioned on a stage 105. In some implementations, the stage 105 is a temperature-controlled stage for precise heating of a substrate during printing. In the example of FIG. 7, an observation camera 107 is positioned with the stage 105 in its field of view and is used to adjust printing parameters to form stable (satellite-free) droplets of printed material by monitoring droplet formation, velocity, and diameter. However, other implementations may not include or utilize an observation camera 107.

Figure 8A:
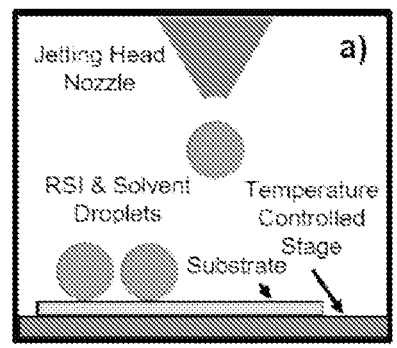
FIGS. 8A, 8B, and 8C are schematic views of an example of a dispensing printing process using the system of FIG. 7.
Figure 8B:
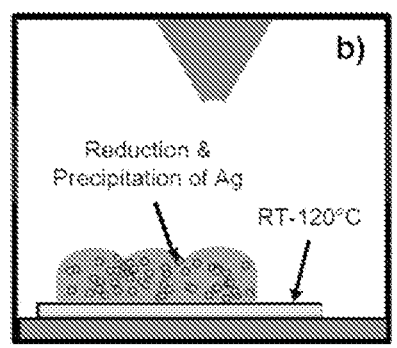
Figure 8C:
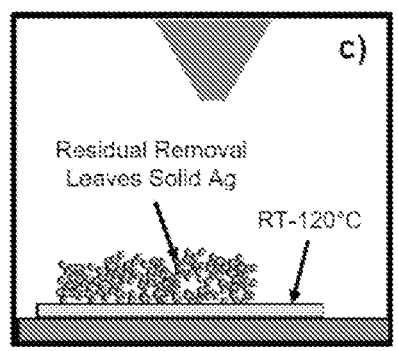

FIGS. 8A, 8B, and 8C illustrate an example using the dispensing printing system of FIG. 7 to print using a reactive silver ink. In FIG. 8A, reactive silver ink (RSI) and solvent droplets are dispensed from the nozzle of the jetting head 101 onto a substrate positioned on the stage 105. The droplets wet and coalesce as shown in FIG. 8B. As fluids evaporate and residuals in the ink are volatilized and removed due to the temperature, a porous, yet solid and pure, Ag material is left printed on the substrate as shown in FIG. 8C.

Although the specific example of FIGS. 8A, 8B, and 8C illustrate using the dispensing printing process to deposit silver materials, the dispensing printing technique can be expanded to utilize other printed "inks" that are configured to provide other structural steps in the manufacturing of components, such as, for example, solar cell components. In particular, dispensing printing can be used for selective patterning techniques as discussed further below.

Figures 9, 10, 11:
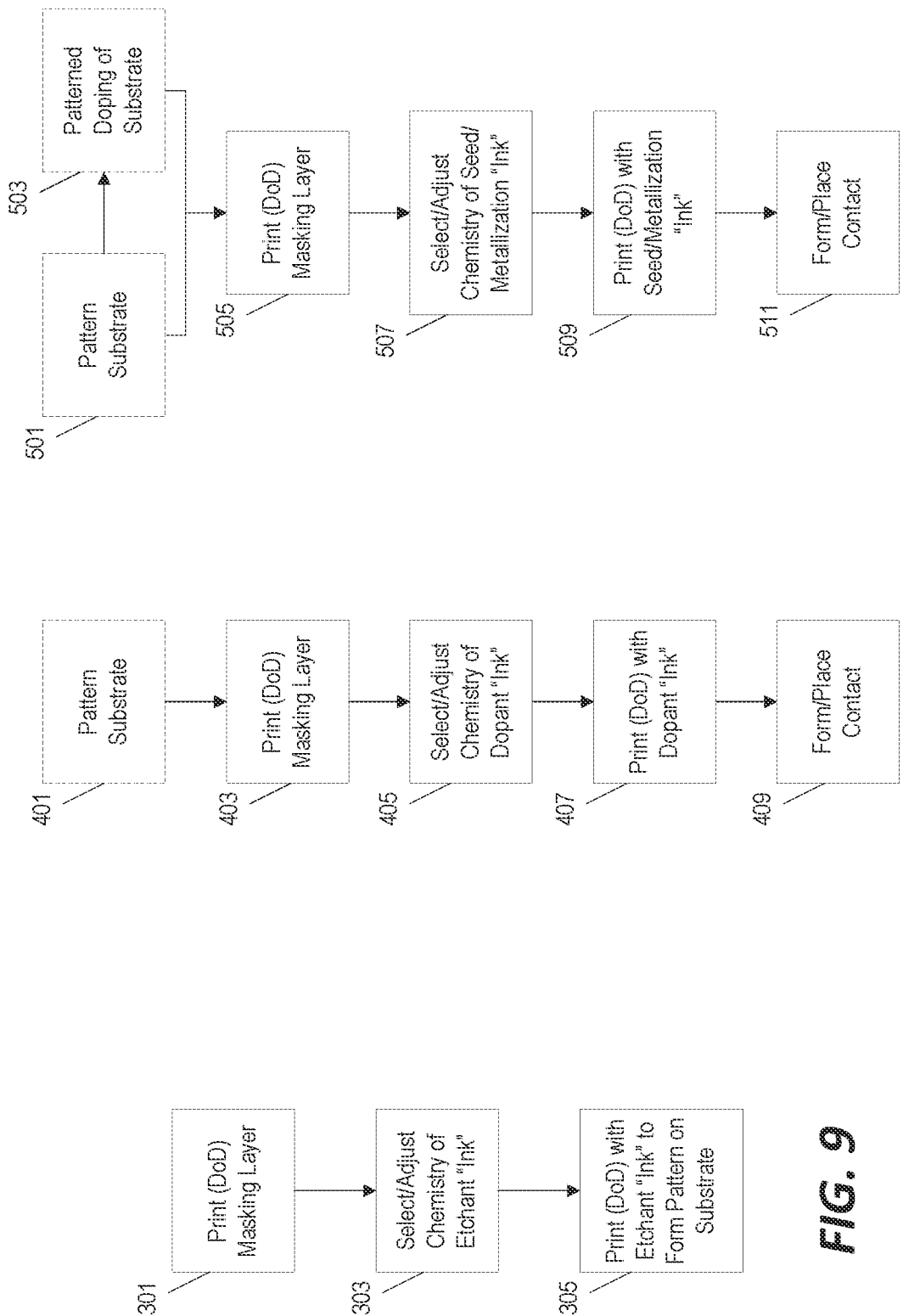
FIG. 9 is a flowchart of a method for etching a pattern into a material using the system of FIG. 7.
FIG. 10 is a flowchart of a method for patterned doping of a surface using the system of FIG. 7.
FIG. 11 is a flowchart of a method for depositing a seed layer or metallization layer using the system of FIG. 7.

FIG. 9 illustrates a method in which dispensing printing is used to directly remove a patterned region of a material. In this example, a pattern is etched into a dielectric/oxide layer using a chemical etchant that is dispensed by dispensing printing. In other words, the chemical etchant is used as the "ink" in the dispensing printing process. First, a masking layer is applied to the surface of the material (e.g., a substrate/wafer) (step 301). The masking layer is used to control the flow of the etchant as it is printed/dispensed onto the surface. In some implementations, the masking layer is formed using dispensing printing to deposit a mask material in a particular pattern. In other implementations, the masking material is deposited as a layer and dispensing printing is used to remove portions of the masking material in the particular pattern to create the mask. The chemistry of the etchant that will be used as the "ink" is selected or adjusted (step 303) to modify the surface tension and wetting of the droplets that will be dispensed onto the substrate. Finally, the etchant "ink" is dispensed onto the substrate using dispensing printing (step 305). As a result, the printed pattern is chemically etched into the surface of the substrate.

Although the example of FIG. 9 (and the other examples discussed below in reference to FIGS. 10, 11, and 12) utilizes a masking layer, other implementations may not utilize a "mask" and instead may deposit the etchant "ink" directly onto the substrate in the printed pattern. Similarly, although the example above discusses creating the masking layer using dispensing printing processes, in other implementations, the mask may be deposited or placed on the substrate surface using different materials and/or different techniques.

FIG. 10 illustrates another example in which high precision dispensing printing is used to selectively pattern a region to be doped directly below where electrical contacts will be formed. In some implementations, the technique of FIG. 4 may be coupled with a process for direct removal of a patterned region of material (step 401) such as, for example, the method of FIG. 9. In other implementations, a separate patterning step might not be utilized. Again, a masking layer is positioned on the surface (step 403) and the chemistry of the "ink" material is adjusted to modify the surface tension and wetting of the droplets that will be dispensed (step 404). In this example, the "ink" that is used for the dispensing printing includes a dopant source—such as, for example, a spin-on-dopant—that is "printed" onto the surface in a pattern to form, for example, a selective emitter. After the pattern is printed using the dopant "ink" (step 407), an electrical contact is formed or placed (step 409). In some implementations, the electrical contact is formed by subsequent annealing of the doped surfaces using thermal annealing (e.g., a furnace or a hot plate) or using athermal annealing (e.g., using a laser or electromagnetic induction).

FIG. 11 illustrates yet another example in which the high precision dispensing printing technique is used to selectively pattern a seed layer or a metallization layer for subsequent deposition of contacts (e.g., plated contacts). In some implementations, the selective patterning of the seed layer as illustrated in the example of FIG. 10 may be coupled with a patterned etching process (such as illustrated in FIG. 9) (step 501) and/or a patterned doping process (such as illustrated in FIG. 10) (step 503). Again a mask is applied to control the flow of the seed/metallization "ink" (step 505) and the chemistry of the "ink" can be selected/adjusted to modify the surface tension and wetting of the droplets (step 507). A seed or metallization material is incorporated into the "ink" and printed onto the substrate in a pattern to form a seed or metallization layer from reactive inks or particle-based inks (step 509). After the seed or metallization layer is formed in the pattern on the substrate, an electrical contact may be formed or placed (step 511).

Figure 12:
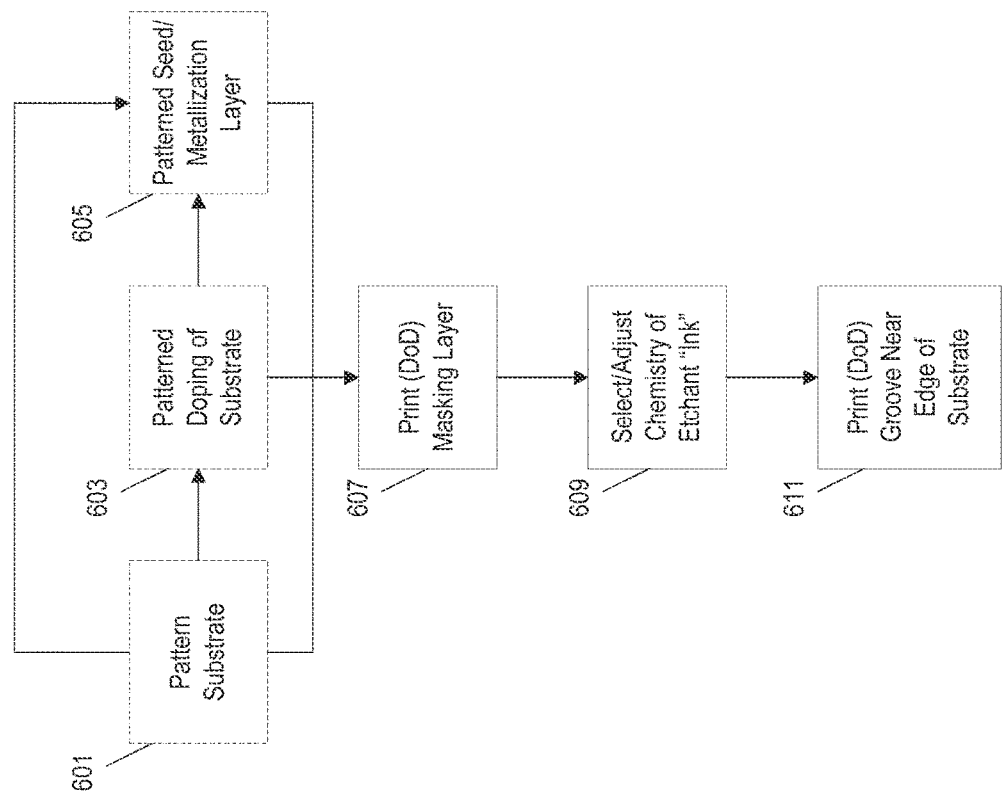
FIG. 12 is a flowchart of a method for isolating the edges of a wafer using the system of FIG. 7.

FIG. 12 illustrates still another example of using dispensing printing for selectively patterning a solar cell device. In the example of FIG. 12, the dispensing printing process is used to isolated edges of the substrate/wafer to prevent shunting. In some implementations, the edge isolation technique of FIG. 12 can be coupled with and performed subsequent to one or more of a patterned etching process (such as illustrated in FIG. 9) (step 601), a patterned doping process (such as illustrated in FIG. 10) (step 603), and a patterned seed/metallization layer deposition process (such as illustrated in FIG. 11) (step 605). In this example, edge isolation is achieved by etching a groove near an edge of the wafer. In some implementations, the groove provides isolation of the edge of the wafer and, in other implementations, the groove acts as a cleave line to completely remove the edges from the wafer. Again, a masking layer can be used to control the flow of the etchant that is used as the "ink" in the dispensing printing process (step 607) and the chemistry of the "ink" can be selected/adjusted to modify the surface tension and wetting of the droplets (step 609). After the mask is applied and an etchant "ink" is selected, the groove is "printed" near the edge of the wafer using the dispensing printing process (step 611).

High temperatures (>400° C.) are typically required for the formation of low-resistance Ohmic contacts in order to form an alloy at the interface between metal and semiconductor or to evaporate conductivity-limiting residues in conductive pastes. The ability to form such contacts at lower temperatures using techniques such as the dispensing printing techniques discussed above broadens optoelectronic device applications to include thermally sensitive substrates and electronically active layers.

A Si-heterojunction (SHJ) cell is a high efficiency, non-concentrated Si-based photovoltaic technology. One limitation of SHJ cells is high series resistance (Rs), that primarily results from the relatively high-resistivity, low-temperature Ag paste that is used to make front contacts. Lower resistance Ag pastes are available for use in diffused junction solar cells which withstand temperatures over 1,000° C. SHJ cells are markedly more thermally sensitive, since surface passivation—typically provided by the a-Si:H—starts to degrade as temperatures exceed ~200° C. Therefore, reducing Rs—by reducing the bulk metal resistance and specific contact resistance—is strategic in achieving higher efficiency SHJ cells. Such issues of thermal sensitivity and detrimentally high Rs are not only limited to SHJ solar cells; other photovoltaic technologies such as perovskites, and organic photovoltaics can drastically improve performance from alleviating these complications.

Metal contact preparation by dispensing printing of conductive polymers—predominantly conductive polymer inks, and metallic nanoparticle inks—has enabled industrially competitive, low-waste, roll-to-roll production of printed contacts. However, conductive polymer inks exhibit relatively high resistivity, and metallic nanoparticle inks still require over 200° C. annealing to render the ink conductive. Additionally, dispensing printing of particle- and nanoparticle-based inks suffer from clogging of high-resolution, small-diameter nozzles; particles in the ink aggregate and form large clusters, thus restricting the printed feature size to that of larger nozzle diameters.

The examples described herein present, among other things, the application and path toward optimization of reactive silver inks (RSI) as front contacts metallization to SHJ solar cells but the proposed morphological control is ink agnostic. RSIs enable dispensing printing of highly conductive features at low temperatures (typically 35-120° C.) without the need of a post-deposition anneal. RSI contacts are synthesized by depositing silver acetate, formic acid, and ammonia following the process illustrated in FIGS. 8A, 8B, and 8C. This process results in the reduction and precipitation of Ag among residual acetate groups at ambient temperature. Upon a low-temperature substrate anneal during printing (optimally at 90° C.), the remaining residuals are volatilized and the RSI contact exhibits conductivity nearly equivalent to that of bulk silver. Additionally, since dispensing printing of reactive inks prints a chemical reaction—not particles suspended in a solvent—very narrow, micron-scale features can be formed from small diameter nozzles.

Dispensing printing of RSI is also economically advantageous as it reduces the amount of Ag used in solar cell manufacturing. In addition to industrial scalability and high throughput of dispensing printing processes, Ag usage and waste is reduced. Ag accounts for about 10% of the non-Si portion of the cell price using other manufacturing techniques. Dispensing printing of RSI offers the opportunity to reduce waste of precious Ag in the process of front metallization of solar cells, as all of the Ag printed is directly used for contacts with no waste compared to use of screen printing of Ag paste (SP Ag paste). Moreover, replacing SP Ag Paste fingers—typically 75-100 µm wide—with dispensing RSI fingers with a width of <35 µm and height of a few microns reduces Ag consumption to less than 10 mg/cell.

Example 1

As described above, the dispensing RSI printing process of FIGS. 8A, 8B, and 8C is performed using the printing system of FIG. 7. The base ink for RSI was prepared with 1.0 g silver acetate ($C_2H_3AgO_2$, anhydrous 99%, Alfa Aesar) dissolved in 2.5 mL ammonium hydroxide ($NH_4OH$, 28-30 wt %, ACS grade, BDH Chemicals). The solution was then stirred for 2 minutes on a vortex mixer to dissolve the silver acetate. Next, 0.2 mL of formic acid ($CH_2O_2$, >=96%, ACS reagent grade, Sigma Aldrich) was added in two steps with a quick stir at the end of each step. The ink was then allowed to sit for 12 hours before being filtered through a 450 nm nylon filter.

This base ink was then diluted 1:1 or 10:1 by volume with ethanol (EtOH, $C_2H_6O$, ACS reagent grade, Sigma Aldrich) to increase the stability of the droplets for printing contact pads (7×7 $mm^2$) on glass slides for bulk resistivity measurements. The diluted ink was then filtered again through the 450 nm nylon filter immediately before use. These 1:1 and 10:1 dispensing RSI contact pads were printed at substrate temperatures of 51, 78, and 107° C. 7×7 $mm^2$ contact pads were formed from a low-cure temperature screen printed silver paste (SP Ag Paste) for a reference resistivity. SP Ag Paste contacts were annealed in a muffle furnace in air for 20 minutes at 200° C. in order to cure the paste. Resistivity was measured using four-point probe. Specific contact resistance of metal/ITO/Si was evaluated by transfer length measurements (TLM).

Figure 13:
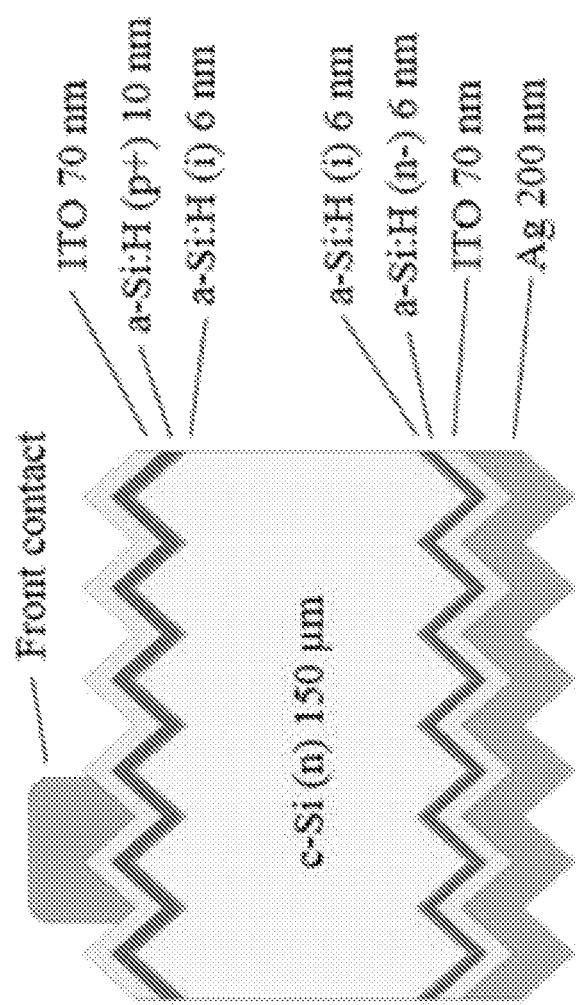
FIG. 13 is a cross-sectional schematic view of an example of a silicon heterojunction (SHJ) solar cell.
Figures 14, 15:
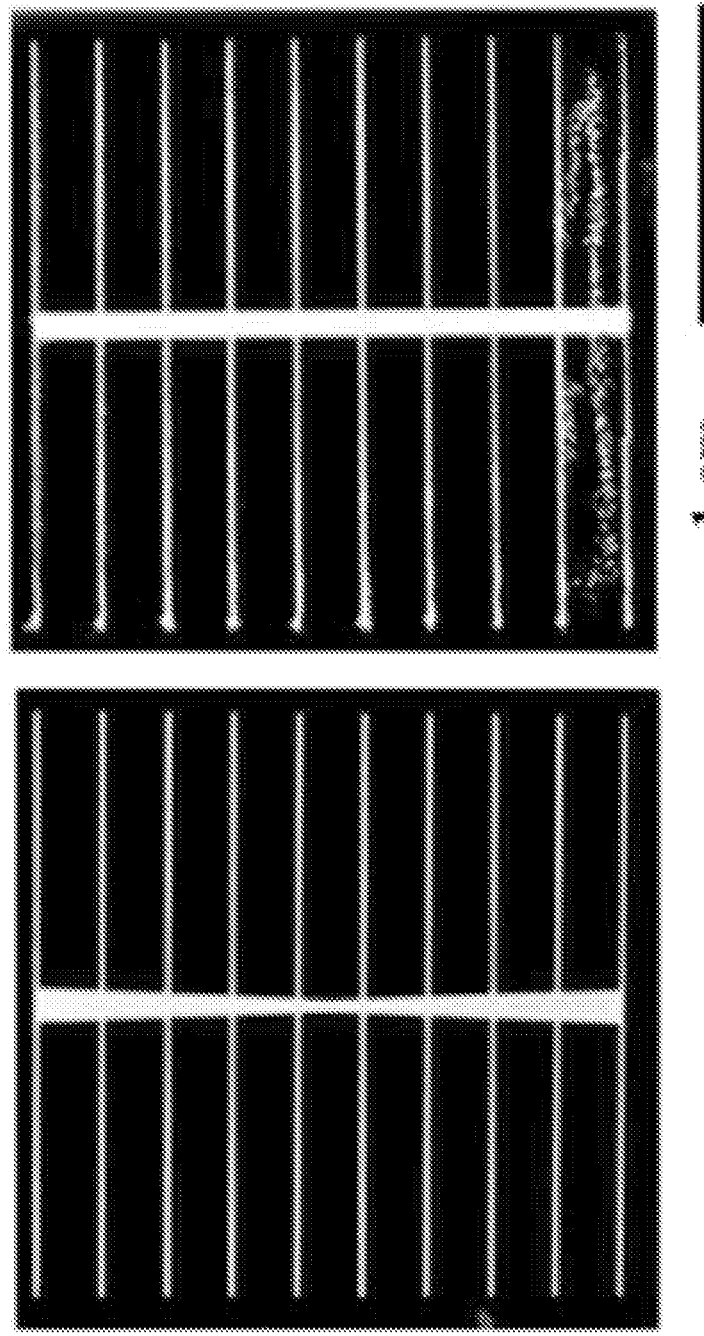
FIG. 14 is an overhead view of a SHJ solar cell of FIG. 13 with front grid metallization formed from screen-printed Ag paste.
FIG. 15 is an overhead view of a SHJ solar cell of FIG. 13 with front grid metallization formed from dispensing printed reactive silver ink.

In this example, SHJ solar cell samples (2×2 $cm^2$) were fabricated on 180-µm-thick n-type Si wafers after standard chemical texturing and cleaning. Layers of the cell from bottom to top are sputtered Ag/ITO/a-Si(n)/c-Si(n)/a-Si(p)/ITO as illustrated in FIG. 13. Front metallization grids were prepared on half of the samples with SP Ag paste as illustrated in FIG. 14. The other half of the samples have front metallization grids formed from dispensing RSI contacts as illustrated in FIG. 15. Reflectance was measured from 300 to 1200 nm on a UV-vis-nIR spectrophotometer with an integrating sphere. In this example, SHJ cells are characterized by one-sun and suns-Voc current-voltage (IV) measurements using a Sinton FCT-400 Series Light IV Tester. Contact morphology and thickness are measured by stylus profilometry and cross-sectional scanning electron microscopy (SEM) at an accelerating voltage of 10 keV. Finger contact widths are imaged by optical microscopy.

In FIG. 8A, the RSI base ink is mixed with a solvent, loaded into the ink reservoir 103, and individual droplets are then jetted through a nozzle of the jetting head 101 onto the substrate. The substrate is heated to a controlled temperature by the stage 105. Ethanol is used as a solvent to decrease the viscosity of the ink for stable droplet formation. Additionally, when the substrate is heated above 78° C.—the boiling temperature of ethanol—ethanol evaporates immediately after printing. After the droplets are jetted, as shown in FIG. 8B, the droplets wet and coalesce. At the same time, the excess ammonia in the RSI evaporates causing the reduction of silver diamine to Ag and silver acetate. Lastly, in FIG. 8C, residuals in the ink are volatilized and removed by the mild temperature of the substrate (optimally at 90° C.), leaving a porous, yet solid, and pure Ag contact. This example of reactive ink reaction is driven by the evolution of the ammonia through the reaction.

The dispensing RSI printing process has various areas for optimization including solvent to ink ratio, and substrate printing temperature. At a substrate temperature of 51° C., the 10:1 (ethanol:RSI) dispensing RSI contact pad had a resistivity of 3.7 μΩcm. For reference, this is about one fifth of the resistivity of SP Ag Paste contacts (20 μΩcm) that have been cured at 200° C. for 20 minutes. For a substrate temperature of 78° C., the resistivity of the 10:1 and 1:1 dispensing RSI contacts are only marginally higher, at 4.1 and 4.4 μΩcm, respectively. At higher temperatures, and higher Ag loading (i.e., the 1:1 ink compared to the more dilute 10:1 ink) the precipitation, and aggregation of Ag occurs faster than the ethanol can be evaporated, leading to higher porosity. As the porosity of a metal increases, the resistivity increases disproportionately due to electron energy loss as it moves through the path of irregularly contacted particles in the porous film.

The rate of evaporation of ethanol increases with increasing temperature. When the substrate temperature is elevated to 107° C., the resistivity of the 1:1 dispensing RSI contact (2 μΩcm) approaches that of bulk Ag (1.6 μΩcm). The various substrate printing temperatures and different solvent to ink ratios show the conditions that produce the lowest resistivity of the dispensing RSI contacts. Furthermore, the dispensing RSI recipe and processing parameters have been optimized to reduce porosity as discussed in further detail below.

Figure 16:
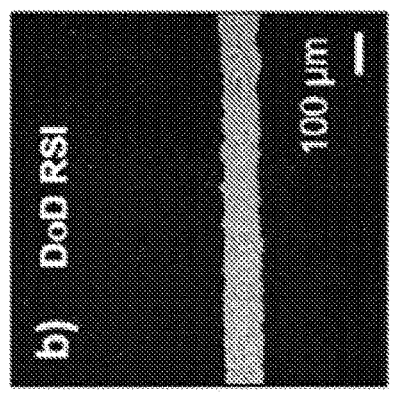
FIG. 16 is an overhead view of an example of a finger contact formed from a screen printed Ag paste.
Figure 17:
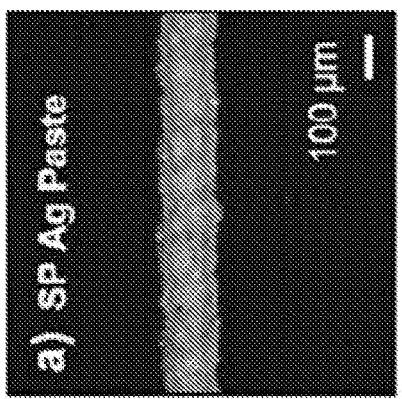
FIG. 17 is an overhead view of an example of a finger contact formed using a reactive silver ink and the system of FIG. 7.

Next, to compare the dispensing RSI contacts to screen printed contacts, SHJ cells were prepared identically, with the exception of front metallization method. FIG. 16 shows fingers formed from screen-printed (SP) Ag paste, and FIG. 17 shows fingers formed from the dispensing RSI process. Fingers formed from SP Ag paste are around 110 μm wide, with a high aspect ratio (finger height to width). The screen pattern used for the SP Ag paste cell had 80 μm-wide openings for fingers. Dispensing RSI fingers demonstrate achievement of thin (about 90 μm wide) continuous fingers. It should be noted that the jetting nozzle used to form these dispensing RSI finger contacts has a 60 μm orifice. Since this printing method deposits a chemical reaction—not particles suspended in a solvent—smaller nozzles can be used (without clogging) to achieve finer line widths with higher resolution features than screen printing processes that are restricted by mesh opening dimensions.

Figure 18:
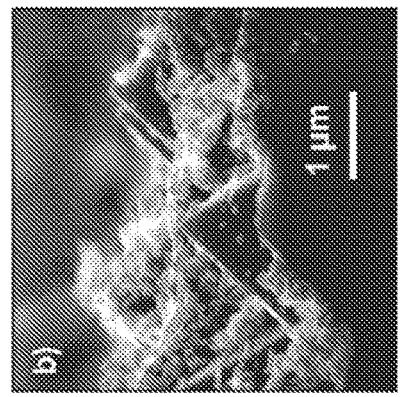
FIG. 18 is an enlarged perspective view of the finger contact of FIG. 16.
Figure 19:
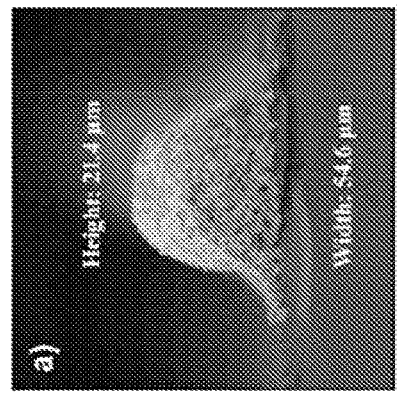
FIG. 19 is an enlarged perspective view of the finger contact of FIG. 17.

The dispensing RSI fingers were printed 5-passes-thick (that is, 5 passes of the printer over each finger feature), however they are lower in aspect ratio compared to the SP Ag Paste fingers. FIG. 18 shows a cross-sectional SEM image of an "ideal" high aspect ratio finger formed from double-screen-printing of Ag paste. In contrast, FIG. 19 shows a cross-sectional SEM of the porous, low aspect ratio dispensing RSI finger on a textured SHJ solar cell. Although the bulk media resistivity of SP Ag paste contacts are about 5 times higher than dispensing RSI contacts, very low cross-sectional area of the dispensing RSI fingers results in higher resistance.

Solar cell series resistance (Rs) is comprised of the resistance of the front grid metallization, the specific contact resistance ($\rho_c$), and the resistance of the solar cell stack. Hence, it is imperative to reduce finger resistance and $\rho_c$ in order to minimize Rs, and achieve higher efficiency. Dispensing RSI contacts had a wide spread of $\rho_c$ values, ranging from $10$-$4$-$10^{-3}$ Ωcm², while the $\rho_c$ of the SP Ag paste contacts were on the order of $10^{-3}$ Ωcm². The large dispersion in $\rho_c$ for DoD RSI contacts is due to the porosity of the contact; areas where the interfacial contact between the Ag particles and ITO is higher, $\rho_c$ is at the lower end of the range reported. Conversely, fingers with less interfacial connectivity result in $\rho_c$ in the higher end of this range. Aspect ratio of DoD RSI fingers can be optimized simply by printing more layers of RSI.

Figure 22:
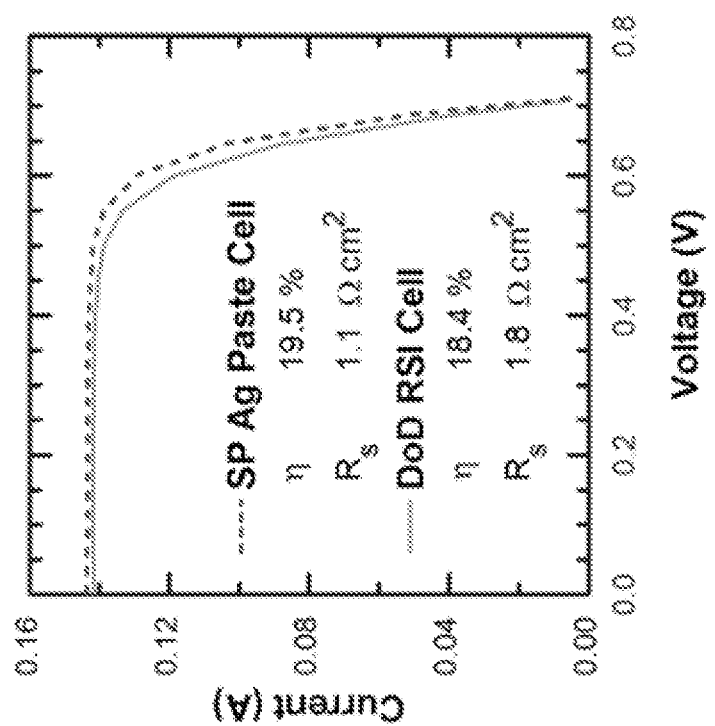
FIG. 22 is graph of current as a function of voltage for front contacted silicon heterojunction solar cells formed using screen-printed Ag paste and formed using dispensing printed reactive silver ink.

FIG. 22 shows one-sun current-voltage (IV) characteristics of SHJ cells with front contacts formed from SP Ag Paste (dashed) and DoD RSI (solid). Since all cells were prepared identically except for the front metallization method, the difference in Rs can be assumed to be only a result from differences in the front contacts. Both cells demonstrate similar pseudo-fill factors (pFF) around 81%, however the DoD RSI cell exhibits a notably lower fill factor (FF), about 3% absolute. This drop in FF is a result of an adversely high Rs of the DoD RSI front contacts. Rs is calculated from the voltage difference at the maximum power point (MPP), from the Suns Voc and One Sun-IV curves.

Compared to SP Ag paste, DoD RSI has lower bulk media resistivity, and lower $\rho_c$. However, DoD RSI cell exhibits slightly higher Rs than SP Ag paste cell. It is suggested that the higher Rs in the DoD RSI cell is due to the porosity and feature sizes approaching the percolation threshold, resulting in higher resistivities in narrow, low aspect ratio fingers on the textured cells.

Dispensing printing of reactive silver ink forms highly conductive contacts at temperatures as low as 51° C., with a minimum resistivity of approximately 2 μΩ·cm. When printed at 78° C., this dispensing RSI yields, porous, high purity Ag features. Similar pFF, $J_{sc}$ and Voc were exhibited by both SHJ solar cells with dispensing RSI, and with SP Ag paste front contacts. The dispensing RSI cell had series resistance of 1.8 Ω·cm² compared to 1.1 Ω·cm² for cells with SP Ag paste. This shows that without optimization, dispensing RSI front contacts perform similarly to SP Ag pastes that have been custom-designed and commercially produced for this application.

Example 2

The base ink for RSI was prepared with 1.0 g of silver acetate ($C_2H_3AgO_2$, anhydrous 99%, Alfa Aesar) was dissolved in 2.5 mL ammonium hydroxide ($NH_4OH$, 28-30 wt %, ACS grade, BDH Chemicals). The solution was then stirred for 2 minutes on a vortex mixer to dissolve the silver acetate. Next, 0.2 mL of formic acid ($CH_2O_2$, ≥96%, ACS reagent grade, Sigma Aldrich) was added in two steps with a quick stir at the end of each step. The ink was then allowed to sit for 12 hours before being filtered through a 450 nm nylon filter. For this example, the RSI was diluted 1:1 by volume with ethanol (EtOH, $C_2H_6O$, ACS reagent grade, Sigma Aldrich) and then filtered again through the 450 nm nylon filter immediately before use.

RSI metallization features were printed in ambient atmosphere on a Microfab Jetlab II inkjet printing system. The Jetlab II is equipped with an MJATP-01 piezoelectric-driven print head with 60-μm-wide nozzle. Samples were printed with the substrate held between 51° C. and 107° C. as measured using a k-type thermocouple in contact with the top surface of the substrate. The silver diamine ink was printed on-the-fly at 5 mm/sec with 25 μm pitch (results in a 200 Hz ejection frequency). All DoD RSI metallizations were printed with five passes of the print head. SP paste grids were printed with an Applied Materials Baccini screen printer using a low-cure-temperature Ag paste from Namics Corporation.

For media resistivity measurements by four-point probe, 7×7 mm² pads were formed from SP paste and DoD RSI on electrically insulating substrates. For bulk optical property measurements by spectrophotometry, 2×2 cm² SP paste and DoD RSI pads were deposited on thin glass slides. The DoD RSI pads were printed at 51° C., 78° C. and 107° C., whereas the SP paste contact pads were formed at room temperature and annealed in a muffle furnace in air for 20 min. at 200° C.

SHJ solar cell samples were fabricated from 5×5 inches 180 μm-thick n-type CZ Si wafers. First, the wafers were chemically textured and cleaned using chemical baths of KOH, piranha, RCA-B and buffered hydrofluoric acid solutions. Next, intrinsic and doped a-Si:H layers were deposited using plasma-enhanced chemical vapor deposition (Applied Materials P-5000). Cells were then defined by DC sputtering (Materials Research Corporation 944 sputtering system) deposition of tin-doped indium oxide (ITO) layers (~80 ohm/□) through a 2×2 cm² shadow mask. The back contact ITO and Ag were also DC sputtered as a full blanket. The complete stack and thicknesses are: ITO 70 nm/(p) a-Si:H 10 nm/(i) a-Si:H 6 nm/(n) c-Si 180 μm/(i) a-Si:H 6 nm/(n) a-Si:H 6 nm/ITO 70 nm Ag 200 nm. Front grids were prepared on half of the samples by screen-printing a low-cure-temperature Ag paste (SP paste).

Next, all samples were annealed in air at 200° C. for 20 min. in order to recover damage incurred during ITO sputtering deposition, in addition to curing the SP paste. Finally, front metallization was prepared according to the above-described RSI printing recipe at 78° C. on annealed SHJ cells.

Reflectance was measured from 300 to 1200 nm on a UV-visnIR spectrophotometer with an integrating sphere. Solar cell performances were characterized by one-sun and suns-VOC current-voltage (I-V) measurements using a Sinton FCT-400 Series Light IV Tester. Surface morphology and cross-sectional thickness of the printed structures were characterized using Field Emission Scanning Electron Microscope at an accelerating voltage of 10.0 kV. The metal/ITO/Si specific contact resistance was assessed by transfer length measurements (TLM) method.

Figure 20:
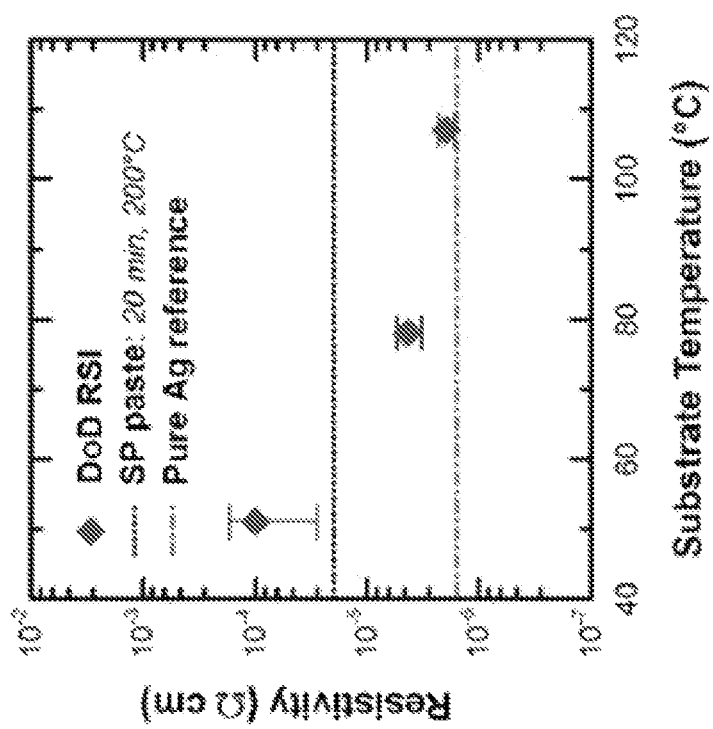
FIG. 20 is a graph of the media resistivity of reactive silver ink printed pads formed at various different substrate temperatures compared to the resistivity of pure Ag and compared to the resistivity of screen-printed Ag past pads.

The electrical and optical properties of large DoD RSI pads were evaluated. FIG. 20 shows media resistivity of 7×7 mm² pads printed at various substrate temperatures, bulk resistivity of pure Ag (1.6 μΩcm), and media resistivity of 7×7 mm² SP paste pads after curing for 20 min. at 200° C. (20 μΩcm). Here, the distinction is made between bulk resistivity, and media resistivity, which is used to describe resistivity of a composite or a porous material. As discussed below, the porosity of the RSI printed features forces electrical conduction to proceed through a network of interconnected particles, and hence the media resistivity values reflect percolation-transport limitations to the actual resistivity. At 51° C., the dispensing RSI pad exhibits an average media resistivity of 100 μΩcm, 5 times higher than values of the SP paste pad. Some prior work was dedicated to fully assess the impact of various humectants, dilutions, and substrate temperatures on the electrical properties of dispensing RSI printed films. These results showed that dispensing RSI films can reach extremely low media resistivities, close to that of bulk Ag. The RSI recipe used here has ethanol as solvent, which has a boiling point of 78° C. Upon increasing the substrate temperature to 78° C., the dispensing RSI pad media resistivity decreased with an average of 4.4 μΩcm. This is only about 2.5 times the resistivity of pure bulk Ag and still an order of magnitude less resistive than metallization pads from cured SP paste. However, note that optimization of curing time and temperature of the SP paste might result in improved media resistivities. The media resistivity of RSI can approach that of pure Ag with removal of residual organics, which is accelerated as substrate temperature is elevated, optimally above 90° C. Heated at 78° C., the RSI printed pad likely still contains traces of these residuals, limiting bulk resistivity. An even lower media resistivity of 2.0 μΩcm was observed for the RSI pad at a substrate temperature of 107° C. Since the dispensing RSI contact pads were deposited in ambient atmosphere, oxidation of Ag is expected to occur at elevated temperatures, resulting in media resistivity slightly higher than pure Ag. Furthermore, the dispensing RSI pad has a porous structure. Moreover, the high surface area exposed to air in these porous RSI pads can favor oxidation and increased media resistivity. Therefore, resistivity of the dispensing RSI metallization pads is expected to approach that of pure Ag by optimization of: (i) the substrate heating temperature to remove all residual organics, (ii) the RSI recipe to reduce porosity, and (iii) by printing in an inert atmosphere to eliminate oxidation at elevated temperatures.

Figure 21:
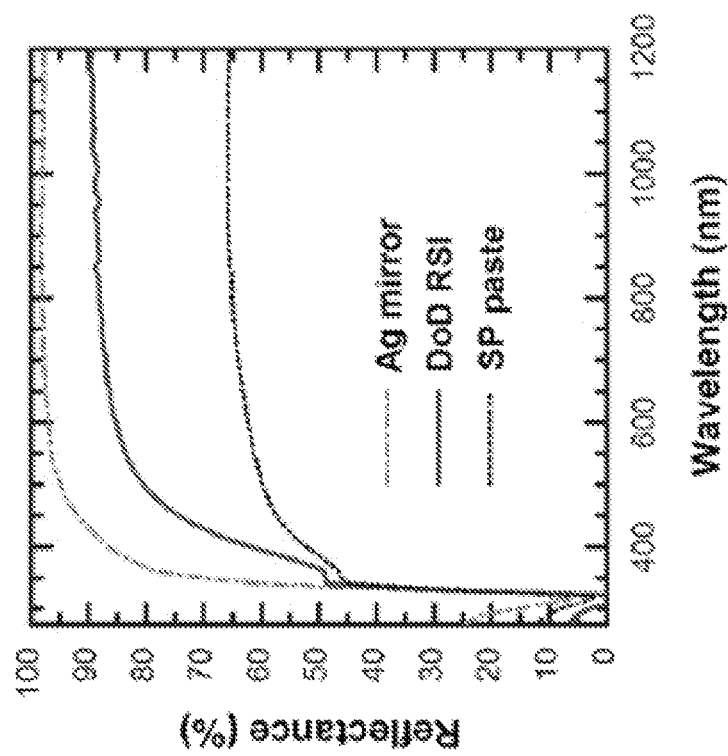
FIG. 21 is a graph of the reflectance spectra of a dispensing printed RSI metallization pad, a screen-printed Ag paste metallization pad, and a pure Ag mirror.

FIG. 21 shows total reflectance spectra of 2×2 cm² pads formed from SP paste and dispensing RSI compared to a smooth, pure Ag mirror. Transmittance measurements (not shown) in the same spectral range for both the dispensing RSI and SP paste pads showed that no light was transmitted through the pads printed on a flat glass surface. The spectrum of the dispensing RSI pad shows 85-90% reflectance above the characteristic absorption edge of Ag around 310-325 nm, which is lower than the mirror Ag (95-98%); it also shows a distinct dip around 350 nm. These are characteristics of a rough Ag surface. The dip in reflectance is attributed to absorption of the light by surface plasmons on the surface features of the dispensing RSI pad, which is negligible for the smooth Ag mirror. Decreased reflectance from 350-1200 nm can have a different origin. It can result from scattering of light in the porous metal structure and enhanced absorption, or the presence of organic residues, which absorb light. For the entire spectral range shown in FIG. 15, the SP paste pad exhibits lower reflectance than the Ag mirror and the dispensing RSI contact pad, likely due to presence of absorbing organics and polymers and a lower fraction of Ag particles. Interestingly, the highly reflective nature of the dispensing RSI pad could be beneficial for use as back metallization for a Si solar cell where it also acts as a light reflector to increase absorption in the Si.

Next, SHJ cells were prepared with front grid electrodes formed from DoD RSI, and from SP paste, as shown in FIGS. 13-15. All solar cells were prepared identically except for the front grid. Fingers for both cells were spaced 2 mm apart; the finger widths and height were 100-130 μm and 20-25 μm for the SP paste cell, and with larger variability 75-145 μm and 1-5 μm for the DoD RSI cells, respectively. Note that the fingers width is relatively similar for both types of preparation; however, the SP paste fingers are 5-10 times taller. In terms of shadowing, the DoD RSI fingers are on average narrower than SP paste fingers, which should result in lower current generation losses. However, the SP paste cell has a tapered bus bar, with an area of ~14 mm², compared to 12 mm² for DoD RSI cell respectively. This could overall compensate for finger-width shading effects in current, however slightly higher shading, and thus lower current generation is expected in the DoD RSI cell. The effect of finger width on solar cell performance was considered to be negligible; the difference in width from both types of front grid metallization is negligible compared to the order of magnitude difference in the media resistivity. FIG. 15 also shows additional metallization spots on the bottom region of the DoD RSI cell, originating from instability of the ink droplet formation during printing. These spots act as additional shading which, if significant, can result in further reduction of photocurrent but should be avoidable with optimization of the printing process.

Figure 26:
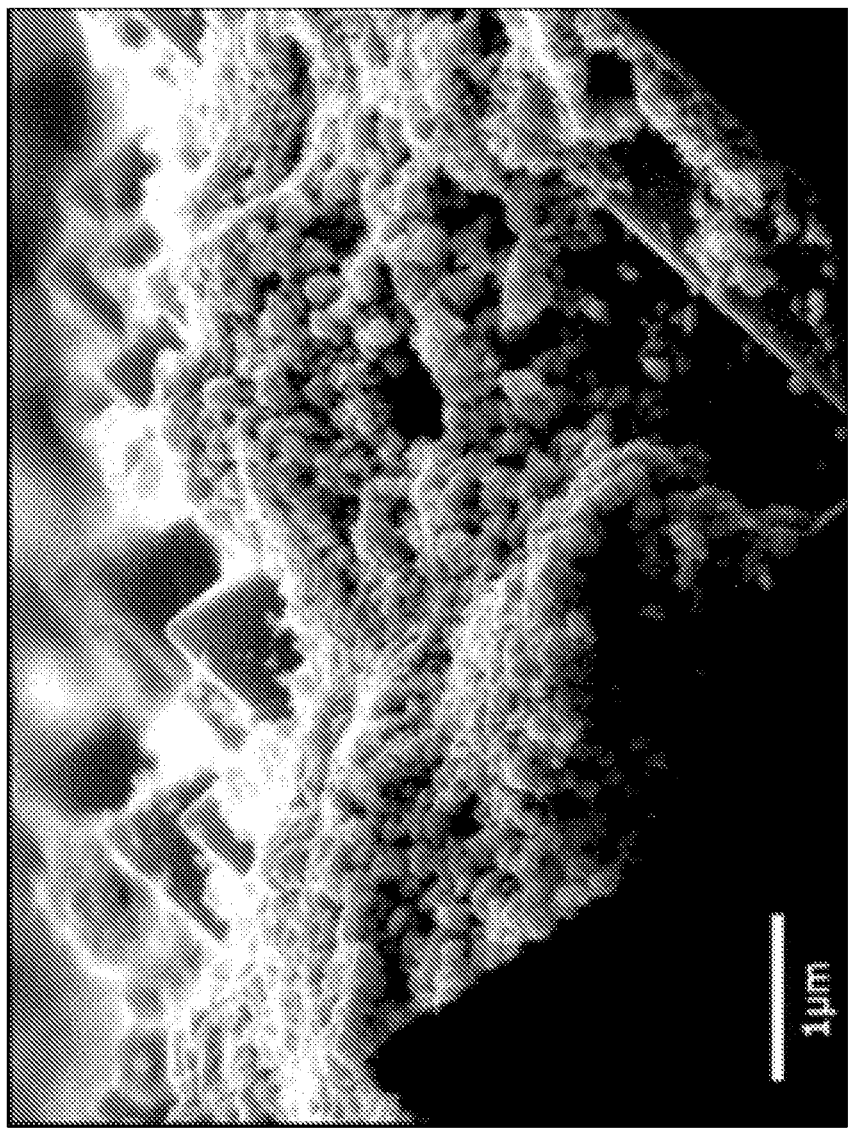
FIG. 26 shows SEM cross-sectional image of a porous DoD RSI finger on a textured SHJ solar cell.
Figure 27:
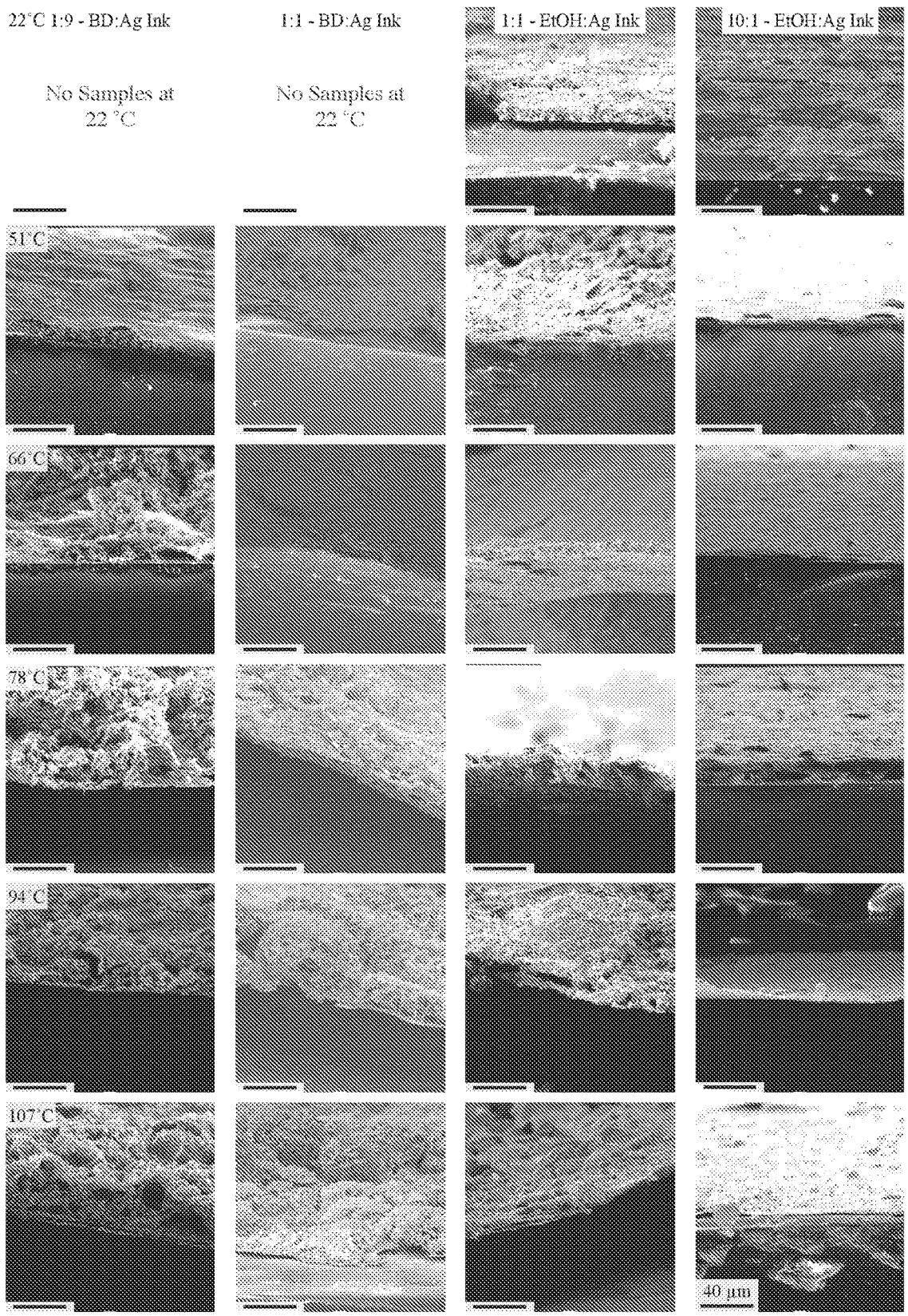
FIG. 27 shows cross-section SEM micrographs at 500× magnification (relative to the 4"×5" Polaroid standard) of inks printed at different substrate temperatures. Columns 1-4 are 1:9 BD:Ag Ink, 1:1 BD:Ag Ink, 1:1 EtOH:Ag Ink, and 10:1 EtOH:Ag ink respectively. Rows 1-6 are 22° C., 51° C., 66° C., 78° C., 94° C., and 107° C. respectively. All scale bars are 40 µm as indicated in the lower right micrograph.
Figure 28:
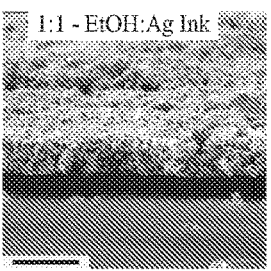
FIG. 28 shows cross-section SEM micrographs at 1000× magnification (relative to the 4"×5" Polaroid standard) of inks printed at different substrate temperatures. Columns 1-4 are 1:9 BD:Ag Ink, 1:1 BD:Ag Ink, 1:1 EtOH:Ag Ink, and 10:1 EtOH:Ag ink respectively. Rows 1-6 are 22° C., 51° C., 66° C., 78° C., 94° C., and 107° C. respectively. All scale bars are 20 µm as indicated in the lower right micrograph.
Figure 28:
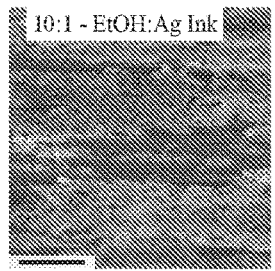
Figure 28:
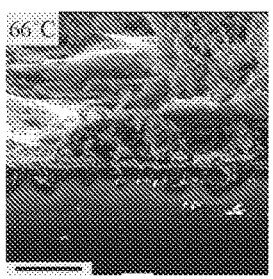
Figure 28:
Figure 28:
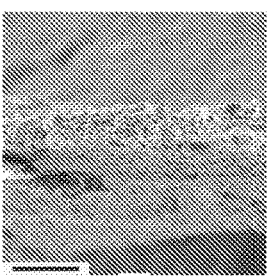
Figure 28:
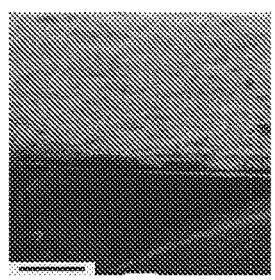
Figure 28:
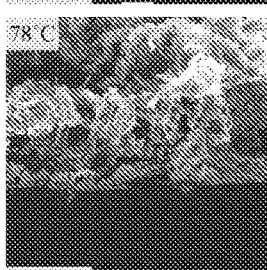
Figure 28:
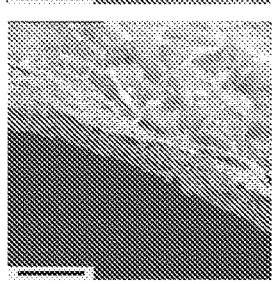
Figure 28:
Figure 28:
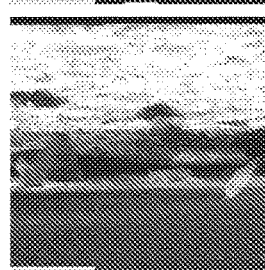
Figure 28:
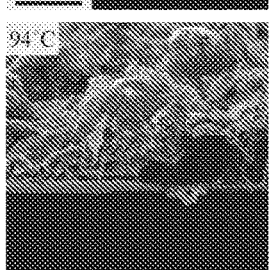
Figure 28:
Figure 28:
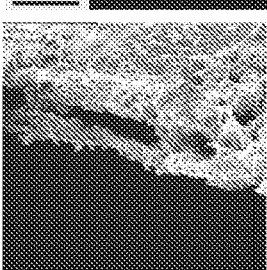
Figure 28:
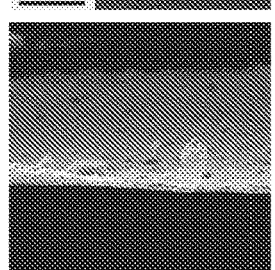
Figure 28:
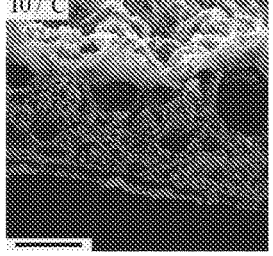
Figure 28:
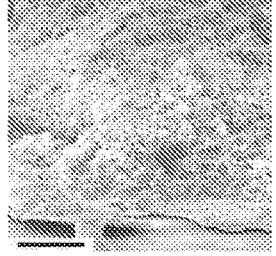
Figure 28:
Figure 28:
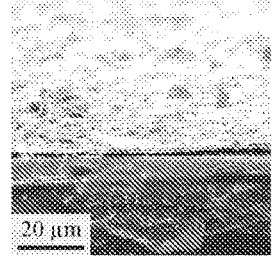
Figure 29:
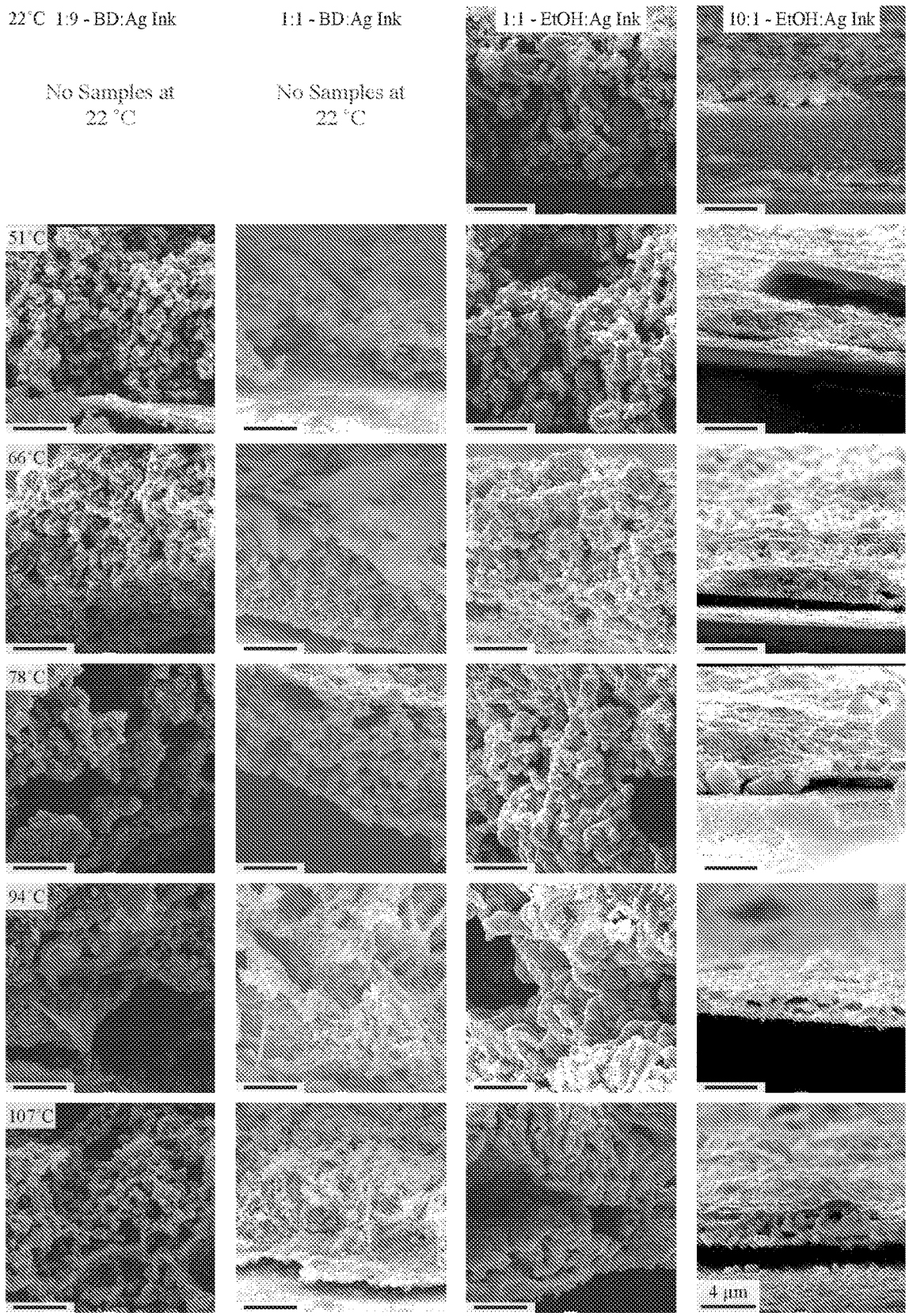
FIG. 29 shows cross-section SEM micrographs at 5000× magnification (relative to the 4"×5" Polaroid standard) of inks printed at different substrate temperatures. Columns 1-4 are 1:9 BD:Ag Ink, 1:1 BD:Ag Ink, 1:1 EtOH:Ag Ink, and 10:1 EtOH:Ag ink respectively. Rows 1-6 are 22° C., 51° C., 66° C., 78° C., 94° C., and 107° C. respectively. All scale bars are 4 µm as indicated in the lower right micrograph.

As shown in FIG. 26, the dispensing RSI finger presents a porous morphology of small interconnected spherical particles about 25-250 nm in diameter; this results in non-uniform coverage of the cell surface, leaving areas of the textured pyramid tips exposed. Printing on the textured surface alters the RSI structure as compared to printing on a flat substrate, as the dispensed ink droplets flow to the trough of the textured valleys, between textured pyramids before nucleating. The resulting morphology on textured surface is expected to influence the RSI finger properties. First, in thinner and more porous fingers, current transport via percolation will be limited by the lower order of connectivity of conductive Ag particles, leading to higher resistance. Second, the poor surface coverage between the Ag particles and the ITO surface can alter interfacial specific contact resistance. These two effects can impact the solar cell series resistance. Third, the adhesion and reliability of the metallization might suffer from non-uniform coverage. Finally, the openings through the dispensing RSI finger contacts might transmit some light through the peaks to the Si and hence allow a beneficial increase in current photogeneration.

Ideal solar cell front grids would have minimal electrical resistivity, and be completely transparent. In a realistic solar cell, optimization of the front grid geometries can mitigate the tradeoff between power losses from shading of wide fingers while minimizing the current carrying capacity of fingers with a small cross sectional area. Solar cell front grid geometries with narrow fingers of high cross-sectional area (high aspect ratio) are expected to yield the best performance. Interestingly, as is discussed below, the solar cells prepared with dispensing RSI front grid perform comparably to the SP paste solar cell—with very little process optimization—despite finger geometry with low aspect-ratio, high porosity, and poor adhesion, showing there is room for improvement. This calls for further investigation of the light interaction with the RSI structure.

Furthermore, the electrical properties are assessed by evaluating the specific contact resistances ($\rho_c$) measured by transfer length measurements, and resistance per unit length on fingers formed from dispensing RSI and SP paste. The $\rho_c$ values of SP paste to ITO/Si range from $10^{-4}$-$10^{-3}$ 11 cm$^2$, whereas the range of values for dispensing RSI fingers to ITO/Si is 1-60×10$^{-4}$ $\Omega$cm$^2$. These $\rho_c$ values are typical of those reported for Ag pastes. On average, the dispensing RSI $\rho_c$ values are one order of magnitude lower, suggesting lower interfacial resistance, likely linked to the lower media resistivity of the dispensing RSI metallization compared to SP paste. Regarding the larger dispersion, it is suggested that where the interfacial contact between the dispensing RSI Ag particles and ITO is higher, the $\rho_c$ is at the lower end of the range reported, whereas fingers with less interfacial connectivity result in $\rho_c$ in the higher end of the range. It is emphasized that the RSI metallizations were formed without the use of adhesion modifiers. Porosity and adhesion of RSI features to ITO are therefore the focus of future work to improve specific contact resistance, along with reliability.

Next, resistance of 1-cm-long SP paste and DoD RSI fingers were measured: the SP paste finger resistance was 3.7$\Omega$, whereas the DoD RSI was 10.2$\Omega$. Though the bulk media resistivity (shown in FIG. 20) of the SP paste films—measured on larger pads—is 5 times higher than the DoD RSI films, the DoD RSI fingers have very low thicknesses t of about 1-5 μm, and have therefore a lower cross sectional area compared to the SP paste fingers 20-25 μm in height. As mentioned previously, the RSI metallization is expected to be more porous when deposited on a textured surface. Similarly, higher porosity is expected for narrow fingers compared to larger (7×7 mm$^2$) pads. During printing, ink-droplets are staggered, allowing partial overlap of adjacent droplets. Droplet overlap allows filling in of open pores in the metallization. For narrow fingers that are formed with only two staggered droplet lines that overlap, there is less ink-droplet overlap than in larger area pads that consist of hundreds of staggered lines, even when printing parameters (i.e., pitch, number of passes of the print head) are the same. The low cross-sectional area and the relatively high porosity result in RSI fingers with higher resistance than SP paste fingers.

Figure 24:
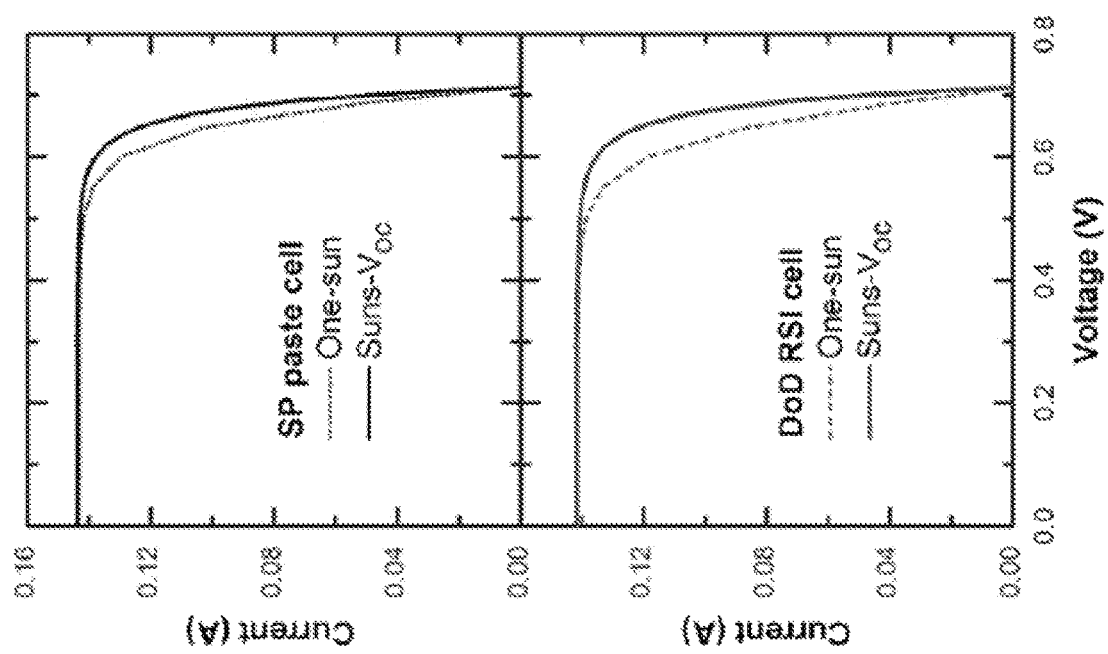
FIG. 24 is a graph of current as a function of voltage for the SHJ solar cells of FIGS. 19 and 20.

Solar cell performance was then evaluated from suns-VOC and one-sun I-V electrical responses. In order to compare the effect of front grid metallization method on solar cell performance, we extract and compare pseudo-fill factors (pFF), fill factors (FF), open-circuit voltage ($V_{OC}$), short-circuit current density ($J_{SC}$), and series resistance (Rs) (see FIG. 23). FIG. 24 shows the I-V characteristics of the SP paste and DoD RSI cells. Suns-$V_{OC}$ I-V, used to extract pFF and Rs, is a measure of solar cell electrical response without the effects of series resistance. First, both cells exhibit similar pFF, the DoD RSI cell pFF is 0.4% lower than for the SP paste cell. Therefore, in the absence of Rs, the cells perform comparably, with the DoD RSI cell only at a marginal disadvantage. This difference in pFF might originate from minor deviations in reproducibility from sample to sample. Moreover, the SP paste cell and DoD RSI cell demonstrate similar $V_{OC}$ of 713 and 712 mV, and close values of $J_{SC}$ of 35.9 and 35.5 mA/cm$^2$, for the SP paste vs. DoD RSI cell, respectively. Approximately 0.2 mA/cm$^2$ difference in $J_{SC}$ is expected from the difference in bus bar shading from the two cells, and difference in light reflection off the grid. The remainder of the $J_{SC}$ difference probably originates from additional shading from the extra metallization spots from RSI printing instability (shown in FIG. 15); it also is possible that this part of the shading was offset by additional absorption of light through the textured peaks that poke through the DoD RSI fingers as shown in FIG. 26.

The similarity in pFF, $J_{SC}$, and $V_{OC}$ for both types of cells are consistent with the assumption that only the difference in front grid metallization methods affect Rs. Next, the suns-Voc and one-sun IV responses were compared. Rs (shown in the table of FIG. 23) is calculated from the voltage difference (V) at maximum power point (MPP), from the suns-$V_{OC}$ and one-sun I-V curves using the equation:

$$R_s = \frac{\Delta V}{J_{MPP,OneSun}}$$

Solar cell series resistance Rs is a lumped term that is comprised of the resistance of each layer, and the interfacial contact resistance between each layer. Again, since the solar cells in the sample set were prepared identically except for the front grid metallization method, the difference in Rs was assumed to only result from differences in resistance of the front grid, and the interfacial contact resistance $\rho_c$ of the front grid to the ITO/Si. Although the lowest $\rho_c$ was demonstrated by the dispensing RSI fingers, series resistance losses have only a square root dependence on $\rho_c$; whereas the series resistance losses scale proportionally with metallization resistance per unit length. Therefore, in this case where $\rho_c$ values have a wide range due to variations in interfacial connectivity of the porous dispensing RSI fingers to the ITO, the difference in the resistance of the fingers per unit length ($R_{grid}/L$) outweighs the benefit of lower average $\rho_c$. This accounts entirely for the slightly lower performance of the cell with the RSI printed finger. This also shows that this is not an intrinsic problem to the dispensing RSI metallization, but is rather linked to the optimization of printing parameters to deposit appropriate thickness and morphology grid on a textured Si and ITO surface.

DoD RSI is capable of producing almost pure Ag metal in narrow front grids at temperatures as low as 51° C., with a high reflectivity and minimum media resistivity of approximately 2.0 µΩcm. When printed at 78° C., a 1:1 (ink: ethanol) RSI recipe yielded porous, high purity Ag features, with structure and metal electrode properties depending on printing conditions and substrate morphology. SHJ cells with DoD RSI front grid electrodes exhibited similar pFF, Jsc and Voc compared to screen-printed silver paste front electrodes. Cells with DoD RSI front grid electrodes had series resistance of 1.8 Ω·cm² compared to 1.1 Ω·cm² for cells with SP paste. This shows that without use of adhesion modifiers or advanced optimization, DoD RSI metallization performs similarly to SP paste metallization that has been custom-designed and commercially produced for this application; it therefore offers an alternative to industrially relevant metallization methods.

Example 3

Most prior studies on low-temperature reactive inks are investigations with the ink printed at room temperature, allowed to dry, and then sintered at elevated temperatures to improve the material properties. These studies have not explored the unique role that temperature and solvent evaporation play in controlling the in situ reduction rates and morphology of the printed structures. While most work provides top-down images of their printed silver, detailed information regarding the porosity and cross-section morphology is lacking. In this example, it is demonstrated how the porosity of silver structures printed with diaminesilver (I) inks can be controlled from 93% porosity down to 50% porosity by adjusting solvent vapor pressure, solvent viscosity, and substrate temperature. These results take advantage of the increase in reduction reaction rate and solvent evaporate rate that occurs at elevated temperatures when solvents with low surface energy and high vapor pressures are used to dilute the silver diamine ink. Two solvents were tested, 2,3-butanediol (BD) and ethanol (EtOH). 2,3-butanediol is a common DoD ink humectant used to prevent evaporation-induced nozzle clogging and has a moderate vapor pressure of 27 Pa and surface tension of 32.5 mNm$^{-1}$. Ethanol was tested as a high vapor pressure solvent (5400 Pa) with a surface tension of 22.4 mNm$^{-1}$ to illustrate the role that solvent evaporation has on decreasing porosity and reducing electrical resistivity when printed at slightly elevated temperatures (60-80° C.). Key features, such as morphology, porosity, and resistivity, vary considerably with solvent type, silver diamine concentration, and substrate temperature. Top-down and cross-section SEM micrographs show the morphology of porous structures varies from the substrate interface, interior, and top-surface. Four-point electrical measurements show that electrical resistivity is improved by increasing film density. This example demonstrates the important role that solvent evaporation and reduction kinetics has on controlling the morphology and conductivity of silver printed using self-reducing, diaminesilver inks.

The base silver ink was prepared with silver acetate ($C_2H_3AgO_2$, anhydrous 99%, Alfa Aesar); ammonium hydroxide ($NH_4OH$, 28-30 wt. %, ACS grade, BDH Chemicals); formic acid ($CH_2O_2$, ≥96%, ACS reagent grade, Sigma-Aldrich); 2,3-butanediol ($C_4H_{10}O_2$, 98%, Sigma-Aldrich); and ethanol (EtOH, $C_2H_6O$, 99.5% Koptec). About 1.0 g of silver acetate was dissolved in 2.5 mL ammonium hydroxide. The solution was then stirred for 2 min on a vortex mixer to dissolve the silver acetate. Next, 0.2 mL of formic acid was added in two steps with a quick stir at the end of each step. The ink was then allowed to sit for 12 h in the dark at room temperature before being filtered through a 450 nm nylon filter and stored at 4° C. until use. Four ink solutions were tested. The control consisted of 1:9 by volume of 2,3-butanediol:Ag ink (denoted as 1:9 BD:Ag) following Lewis' recipe (10 vol. % of 2,3-butanediol). The second ink was a more dilute 1:1 BD:Ag ink. The third and fourth ink solutions tested were solutions of EtOH and Ag ink at volume ratios of 1:1 EtOH:Ag ink and 10:1 EtOH:Ag ink. Additional formulations were attempted to get broader overlap in concentrations between the two solvents; however, 5:1 BD:Ag ink and 10:1 BD:Ag ink were too viscous to form steady droplets and the high evaporation rate of the 1:9 EtOH:Ag ink quickly clogged the nozzle.

Table 1 lists the material properties of the four inks along with the number of layers and the calculated ideal thickness if 100% of the silver diamine was reduced to metallic silver with 100% density. The number of layers for each ink was chosen to keep the ideal thickness approximately the same for the inks except the 10:1 EtOH:Ag. The dynamic viscosity, μ, of each ink was measured using a Rheosense microVISC viscometer with a 50 µm deep flow channel (microVISC A05, range: 0-100 cP). Contact angle measurements were made on a glass slide stored under $N_2$ and $O_2$ plasma cleaned for 2 min using a Blue Lantern BL-300 plasma etcher immediately prior to contact angle measurements. A Ramé-Hart 290-U1 automated goniometer was used to measure contact angle.

TABLE 1

Silver ion concentration and loading wt. %, number of layers, ideal 100% dense thickness, viscosity, and contact angle on $O_2$ plasma-treated $SiO_2$ for each ink.

| | [Ag⁺] | | | ideal | | contact |
|---|---|---|---|---|---|---|
| ink | (mol L$^{-1}$) | (wt. %) | layers (#) | thickness (µm) | viscosity (mPa · s) | angle (°) |
| 1:9-BD:Ag | 2.00 | 17.3 | 3 | 2.4 | 4.3 | 22 |
| 1:1-BD:Ag | 1.11 | 10.5 | 5 | 2.0 | 13.0 | 20 |
| 1:1-EtOH:Ag | 1.11 | 11.6 | 5 | 3.1 | 3.8 | ~0 |
| 10:1-EtOH:Ag | 0.20 | 2.6 | 10 | 0.8 | 1.8 | ~0 |

Note
that the ideal thickness for each ink was calculated using the mean droplet diameter and pitch listed in Table 2.

TABLE 2

MicroFab Jetlab II printing parameters for silver reactive inks diluted in ethanol and 2,3-butanediol. Printing was done on the fly at 10 mms$^{-1}$ at substrate temperature from 22-107° C.

| ink | [Ag$^+$] (mol L$^{-1}$) | pitch (wt. %) | rise (#) | dwell (μs) | dwell (V) | Fall (μs) | echo (μs) | echo (V) | Freq. (Hz) | Press. (kPa) |
|---|---|---|---|---|---|---|---|---|---|---|
| 1:9-BD:Ag | 36 | 25 | 3 | 23 | 15 | 4 | 10 | −25 | 600 | 1.2 |
| 1:1-BD:Ag | 35 | 25 | 3 | 23 | 15 | 4 | 10 | −25 | 600 | 1.2 |
| 1:1-EtOH:Ag | 40 | 25 | 3 | 15 | 25 | 4 | 10 | −25 | 600 | 1.2 |
| 10:1-EtOH:Ag | 36 | 25 | 3 | 15 | 25 | 4 | 10 | −25 | 600 | 1.2 |

A mixture of 0.5M tin (II) chloride solution in DI water mixed 1:1 by volume with 0.5M HCl was used as a sensitizing adhesion promoter to keep the silver samples from pulling off the substrate during sheet resistance measurements. Substrates were dipped in this solution for 300 s, rinsed in DI water, and dried using N$_2$. Silver reactive ink squares were printed using a MicroFab Jetlab II microdispensing inkjet printer. Drop volume, velocity, and quality were observed using a horizontal camera and strobe light. The Jetlab II was equipped with an MJ-ATP-01 piezoelectric-driven printed head with 60 μm orifice with a diamond-like coating to reduce wetting. Table 2 shows the print parameters used for various inks. These values were optimized to generate consistent droplets with minimal satellite droplets; satellite droplets were predominately observed only with the 1:1 EtOH:Ag ink. 25×50×1 mm glass microscope slides were used as print substrates. When printed at elevated temperatures, the substrates were placed on the heated stage and allowed to reach equilibrium (~10 min). The print temperature was measured using a thermocouple in contact with the top of the substrate immediately prior to printing.

A 7×7 mm square samples were printed with each ink and temperature combination with the number of layers listed in Table 1. Offsets and cross-hatching were used to increase the uniformity of the printed film. Every other layer, an origin offset of half the droplet pitch in x and y along with a change in the printing direction by 90° was incorporated. Printing was done on-the-fly at a print velocity of 10 mms$^{-1}$. After each layer was printed, the droplet was inspected to verify that the nozzle did not dry out during the previous print. This step was always accompanied by a purge to replenish fresh ink at the nozzle tip. A digital pressure controller was used to stabilize the pressure to the previous value, following a purge. The time between layers varied slightly depending on the ink/temperature being used. Before printing the next layer, it was visually verified that the previous layer had dried.

Morphology and cross sectional thickness was characterized using an Amray 1910 field emission scanning electron microscope (FESEM) at 20 kV accelerating voltage and a working distance of 5 mm for top-down images and 7-15 mm at 75-80° for cross-section images. An Apollo XPP Energy Dispersion Spectrometer (EDS) operating at 20 kV was used to collect elemental composition. Sheet resistance was measured using a Signatone S-302 4-point probe station with 500 μm diameter tungsten-carbide probe tips spaced 1.0 mm apart with an Agilent 34420A nanovolt/μΩ meter.

Solvent type, diamine-silver (I) concentration, and substrate temperature dramatically impact the morphology and electrical properties of silver printed from silver-diamine inks. The four inks (1:9-BD:Ag, 1:1-BD:Ag, 1:1-EtOH:Ag, 10:1-EtOH:Ag by volume; BD=2,3-butanediol, EtOH=ethanol) were printed on glass substrates coated with a thin layer of tin (II) chloride as an adhesion layer at temperatures ranging from room (22° C.) to 105° C. Silver films stabilized with 2,3-butanediol did not dry at room temperature and were not measured with SEM or 4-point probes. Collages of representative SEM cross-sections at magnifications ranging from 500× to 25,000× relative to the polaroid 5"×4" standard are provided in the Supporting Information (FIG. S2-S12, online at www.pss-a.com) and illustrate the differences in both the morphology of the overall films and particle size/shape.

Figure 38:
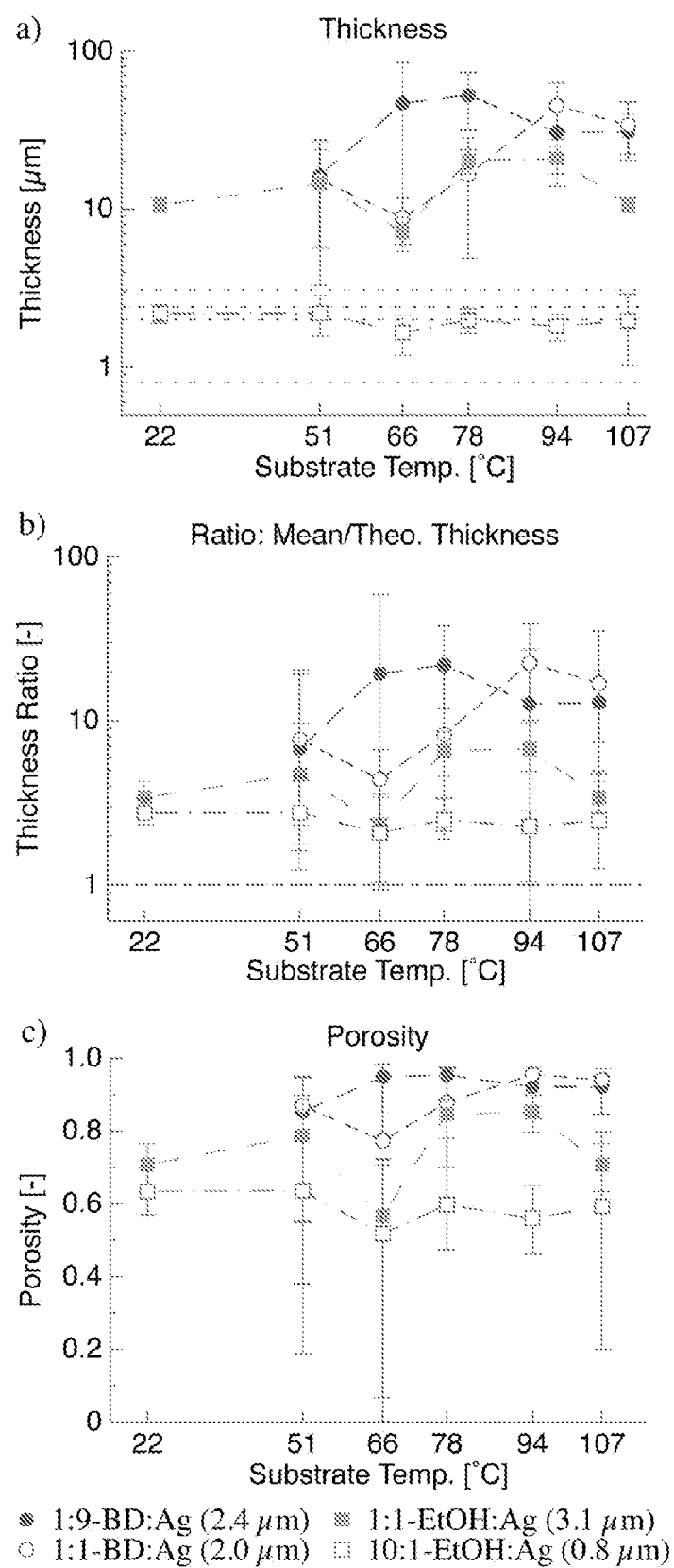
FIGS. 38A-C graphically illustrate the impact of substrate temperature on: (A) Thickness of the four inks measured using SEM cross-sections. Dotted horizontal lines indicate the theoretical smallest thickness with numerical values given in the legend at the bottom. (B) Ratio of measured thickness to theoretical smallest thickness; orange line shows ideal ratio of 1. (C) Porosity in percent. Notice that a local minima occurs at 66 8 C for all inks except the 1:9-BD:Ag ink. The 10:1-EtOH:Ag ink shows the lowest overall porosity across all temperatures.

The graphs in FIG. 38 illustrate the impact of solvent selection, ink concentration, and substrate temperature on film thickness and porosity. FIG. 38A shows the mean measured thickness, $t_m$ (error bars are maximum and minimum measured thickness) taken from SEM cross-sections. Connecting dashed lines were added to guide the eye; horizontal dotted lines show the theoretical thickness, $t_t$, of each film if the silver was 100% dense as calculated from the known silver ion concentration, droplet volume, and droplet pitch. FIG. 38B scales the thickness data by the theoretical 100% dense film thickness as ratio, f, where $f=t_m/t_t$ and FIG. 38C plots the porosity, $\Phi$, of the films where porosity is defined as $\Phi=1-1/f$. Both the 1:1-BD:Ag ink and the 1:1-EtOH:Ag ink have the same base silver ink concentration, yet the 2,3-butanediol ink has a thickness ratio of ~4.7× compare to the ~2.5× for the ethanol stabilized ink (1=0.76 vs. 0.57, respectively). The 2,3-butanediol stabilized ink shows large platelet structures on the surface of the silver film when printed at low temperatures. These structures suggest that a silver shell or "skin" is being formed at the liquid/vapor interface where ammonia concentration would be lowest. This low vapor pressure, low viscosity 2,3-butanediol stabilized ink will show a larger concentration gradient compared with the ethanol stabilized ink and is more likely to form a skin of silver at this interface.

Figure 39:
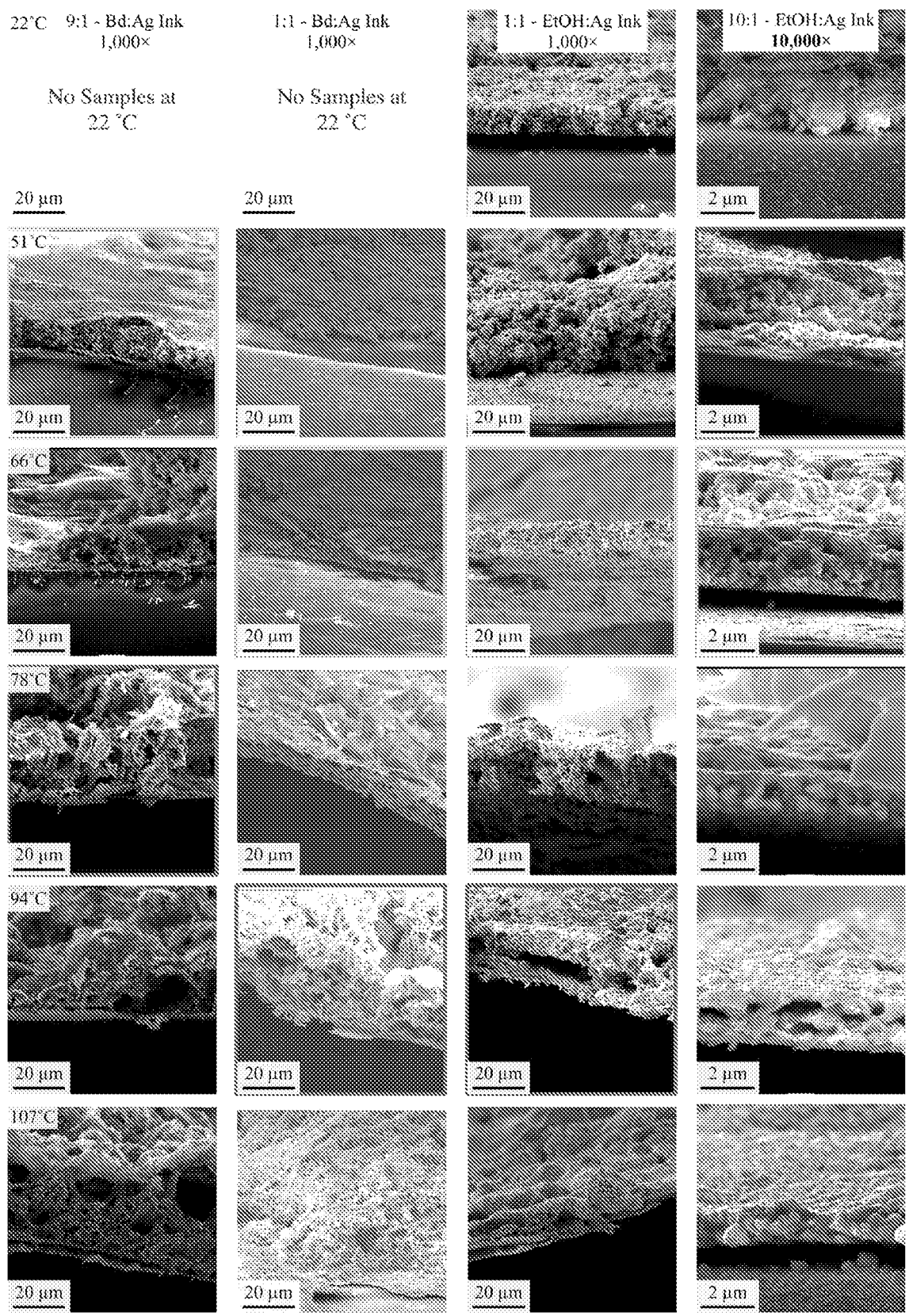
FIG. 39 are representative cross-section SEM micrographs of each ink (columns) at each substrate temperature tested (rows). Columns 1-3 are at 1000× relative to the 4"×5" polaroid standard; the 10:1-EtOH:Ag ink in column 4 is at 10,000× due to how thin this film is. The lowest porosity for each ink is highlighted in green, the highest porosity in red.

FIG. 39 shows the SEM cross-section collages with representative SEM micrographs of each ink composition (columns) at each substrate temperature (rows). Note that the first three columns were taken at 1000× relative to the Polaroid 5"×400" standard, but the thinner 10:1 EtOH:Ag ink in the last column requires a higher 10,000× magnification to show the relevant features. These micrographs illustrate the dramatic difference between the 2,3-butanediol and ethanol solvents. The 2,3-butanediol inks are significantly thicker, more porous, and show larger hollow regions with flakes on the upper surfaces when printed at 66 and 78° C. All inks showed larger pockets when printed at higher temperatures, indicating that the silver diamine (I) likely reduces quickly to create pockets of trapped solvent that leave behind a hole as the solvent evaporates.

Figure 30:
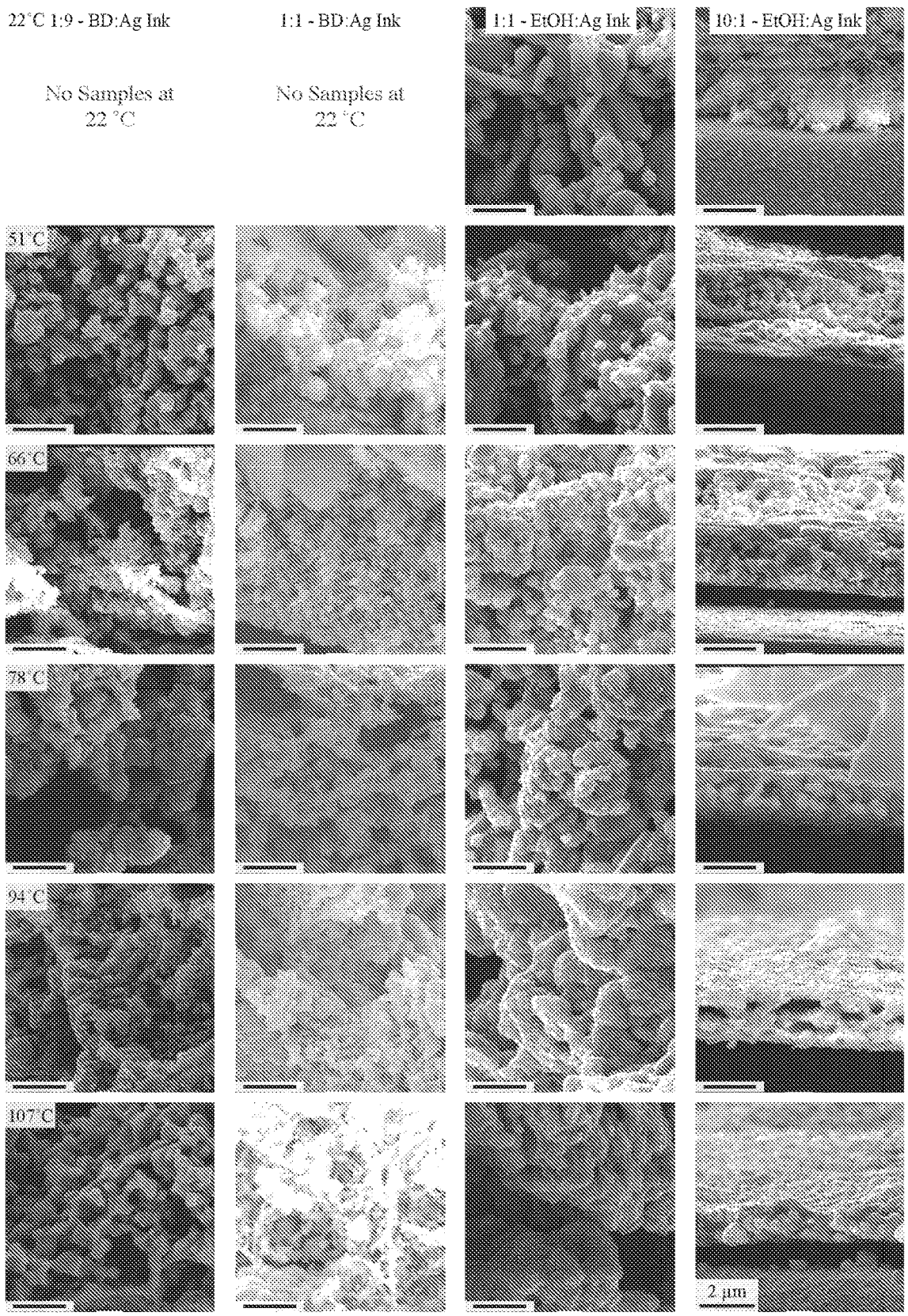
FIG. 30 shows cross-section SEM micrographs at 10000× magnification (relative to the 4"×5" Polaroid standard) of inks printed at different substrate temperatures. Columns 1-4 are 1:9 BD:Ag Ink, 1:1 BD:Ag Ink, 1:1 EtOH:Ag Ink, and 10:1 EtOH:Ag ink respectively. Rows 1-6 are 22° C., 51° C., 66° C., 78° C., 94° C., and 107° C. respectively. All scale bars are 2 µm as indicated in the lower right micrograph.
Figure 31:
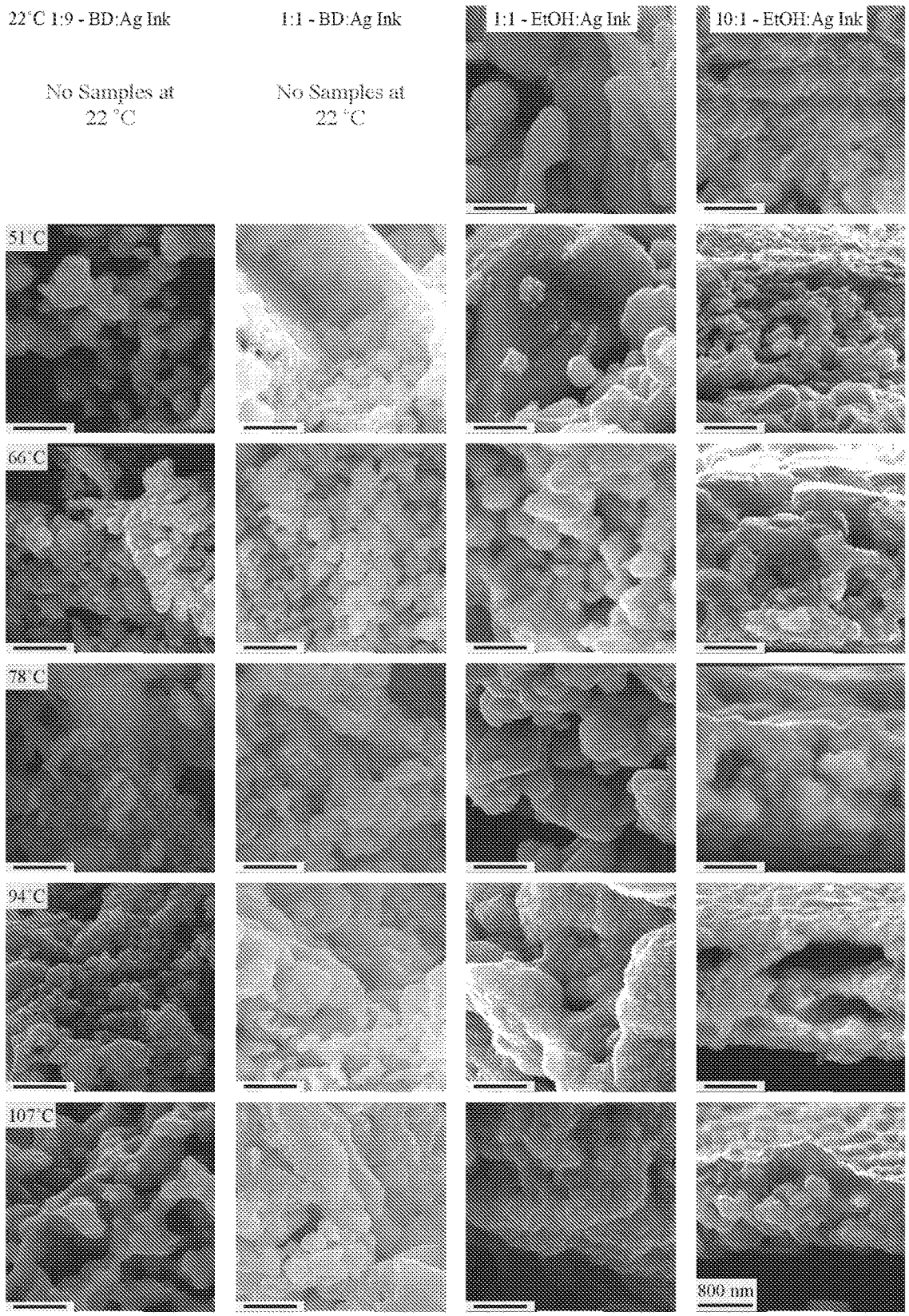
FIG. 31 shows cross-section SEM micrographs at 25000× magnification (relative to the 4"×5" Polaroid standard) of inks printed at different substrate temperatures. Columns 1-4 are 1:9 BD:Ag Ink, 1:1 BD:Ag Ink, 1:1 EtOH:Ag Ink, and 10:1 EtOH:Ag ink respectively. Rows 1-6 are 22° C., 51° C., 66° C., 78° C., 94° C., and 107° C. respectively. All scale bars are 800 nm as indicated in the lower right micrograph.
Figure 32:
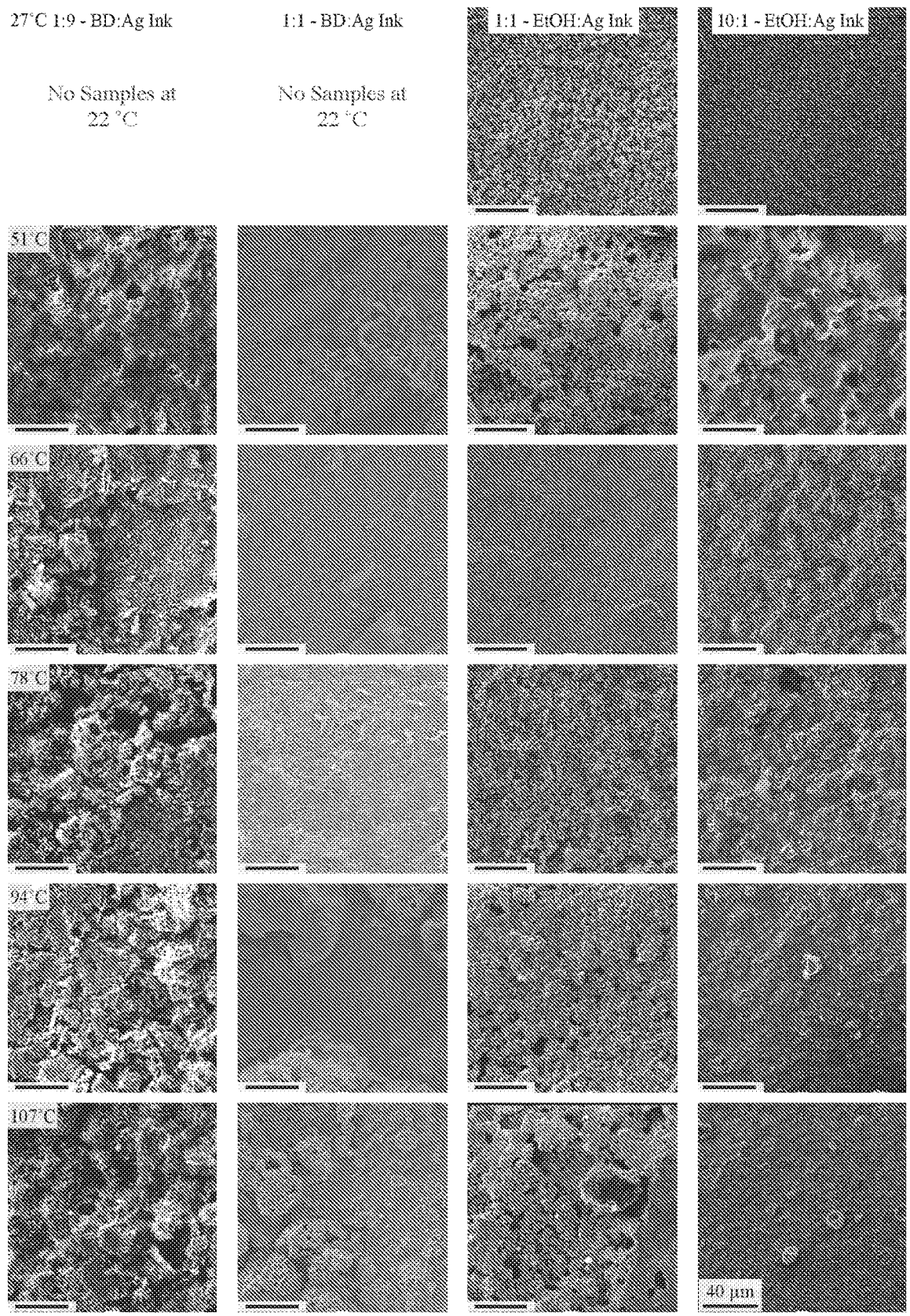
FIG. 32 shows top-down SEM micrographs at 500× magnification (relative to the 4"×5" Polaroid standard) of inks printed at different substrate temperatures. Columns 1-4 are 1:9 BD:Ag Ink, 1:1 BD:Ag Ink, 1:1 EtOH:Ag Ink, and 10:1 EtOH:Ag ink respectively. Rows 1-6 are 22° C., 51° C., 66° C., 78° C., 94° C., and 107° C. respectively. All scale bars are 40 µm as indicated in the lower right micrograph.
Figure 33:
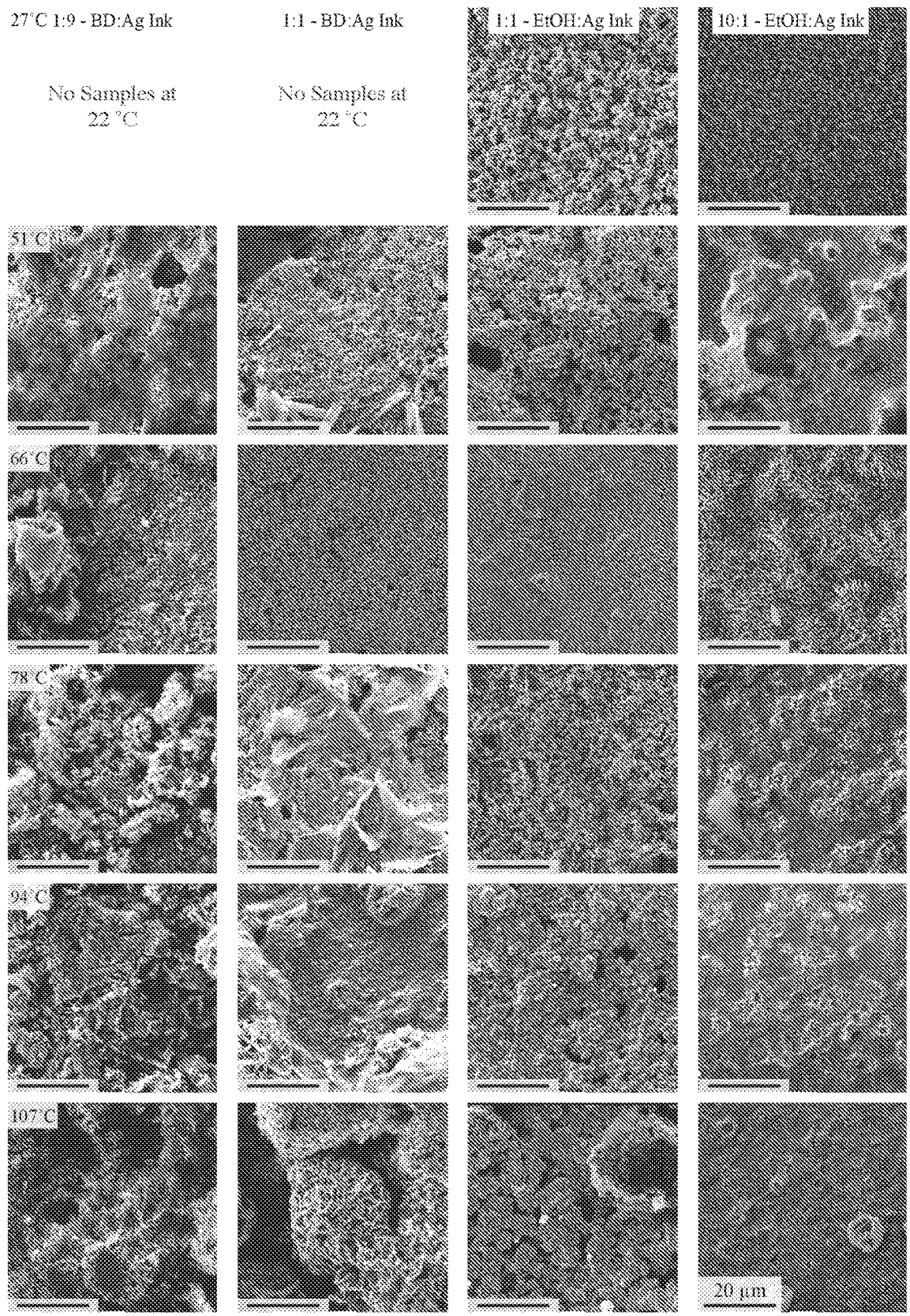
FIG. 33 shows top-down SEM micrographs at 1000× magnification (relative to the 4"×5" Polaroid standard) of inks printed at different substrate temperatures. Columns 1-4 are 1:9 BD:Ag Ink, 1:1 BD:Ag Ink, 1:1 EtOH:Ag Ink, and 10:1 EtOH:Ag ink respectively. Rows 1-6 are 22° C., 51° C., 66° C., 78° C., 94° C., and 107° C. respectively. All scale bars are 20 µm as indicated in the lower right micrograph.
Figure 34:
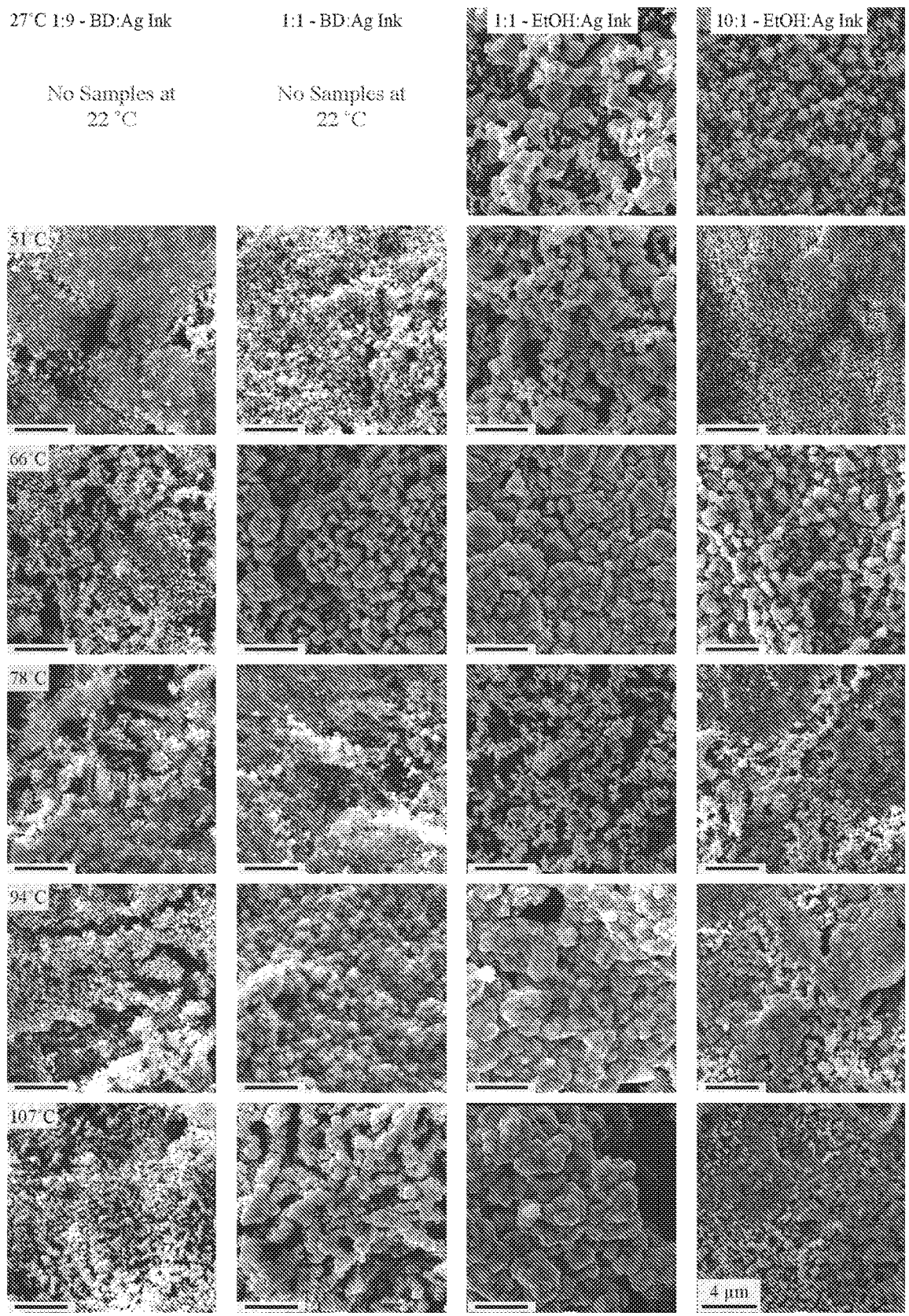
FIG. 34 shows top-down SEM micrographs at 5000× magnification (relative to the 4"×5" Polaroid standard) of inks printed at different substrate temperatures. Columns 1-4 are 1:9 BD:Ag Ink, 1:1 BD:Ag Ink, 1:1 EtOH:Ag Ink, and 10:1 EtOH:Ag ink respectively. Rows 1-6 are 22° C., 51° C., 66° C., 78° C., 94° C., and 107° C. respectively. All scale bars are 4 µm as indicated in the lower right micrograph.
Figure 35:
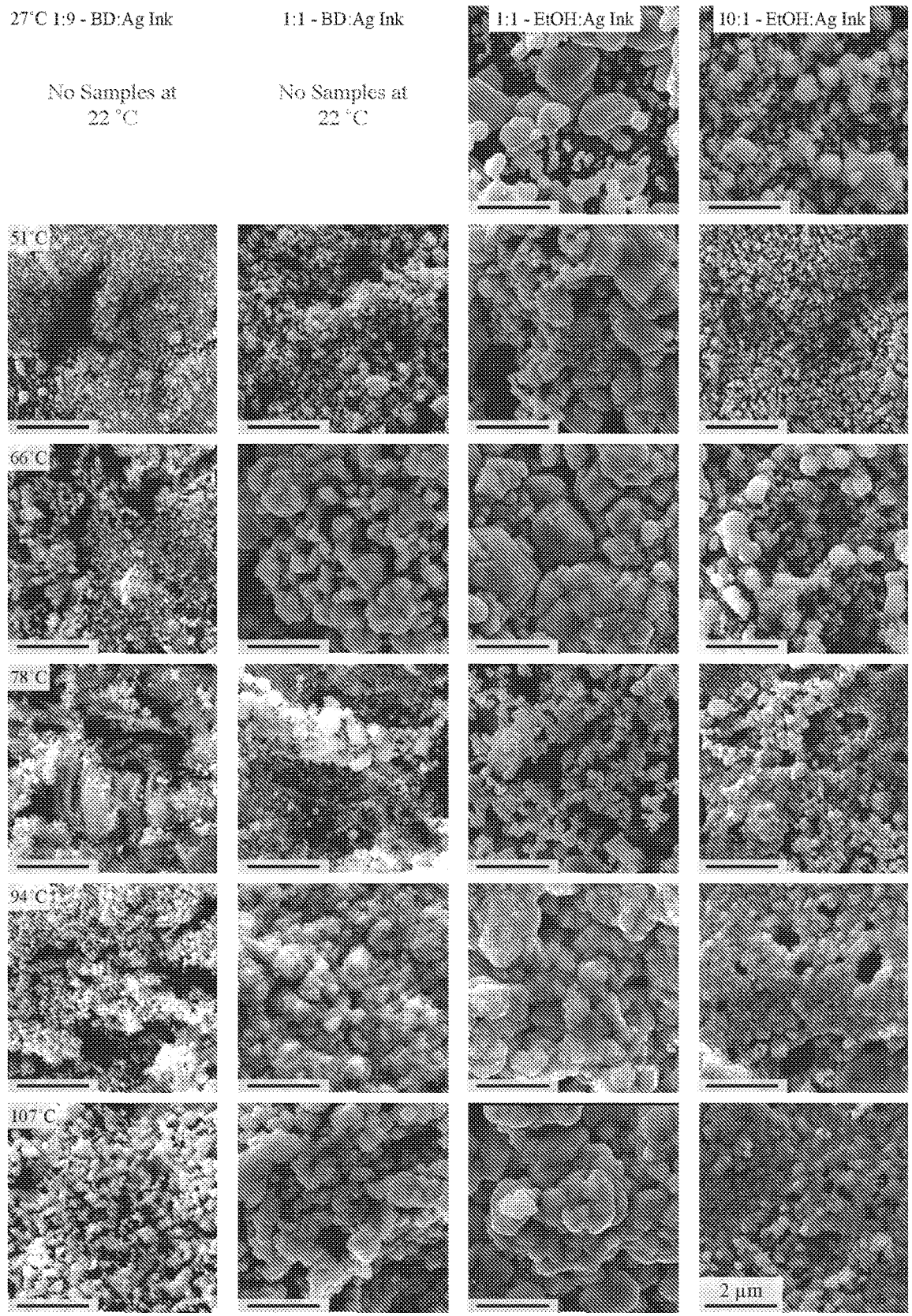
FIG. 35 shows top-down SEM micrographs at 10000× magnification (relative to the 4"×5" Polaroid standard) of inks printed at different substrate temperatures. Columns 1-4 are 1:9 BD:Ag Ink, 1:1 BD:Ag Ink, 1:1 EtOH:Ag Ink, and 10:1 EtOH:Ag ink respectively. Rows 1-6 are 22° C., 51° C., 66° C., 78° C., 94° C., and 107° C. respectively. All scale bars are 2 µm as indicated in the lower right micrograph.
Figure 36:
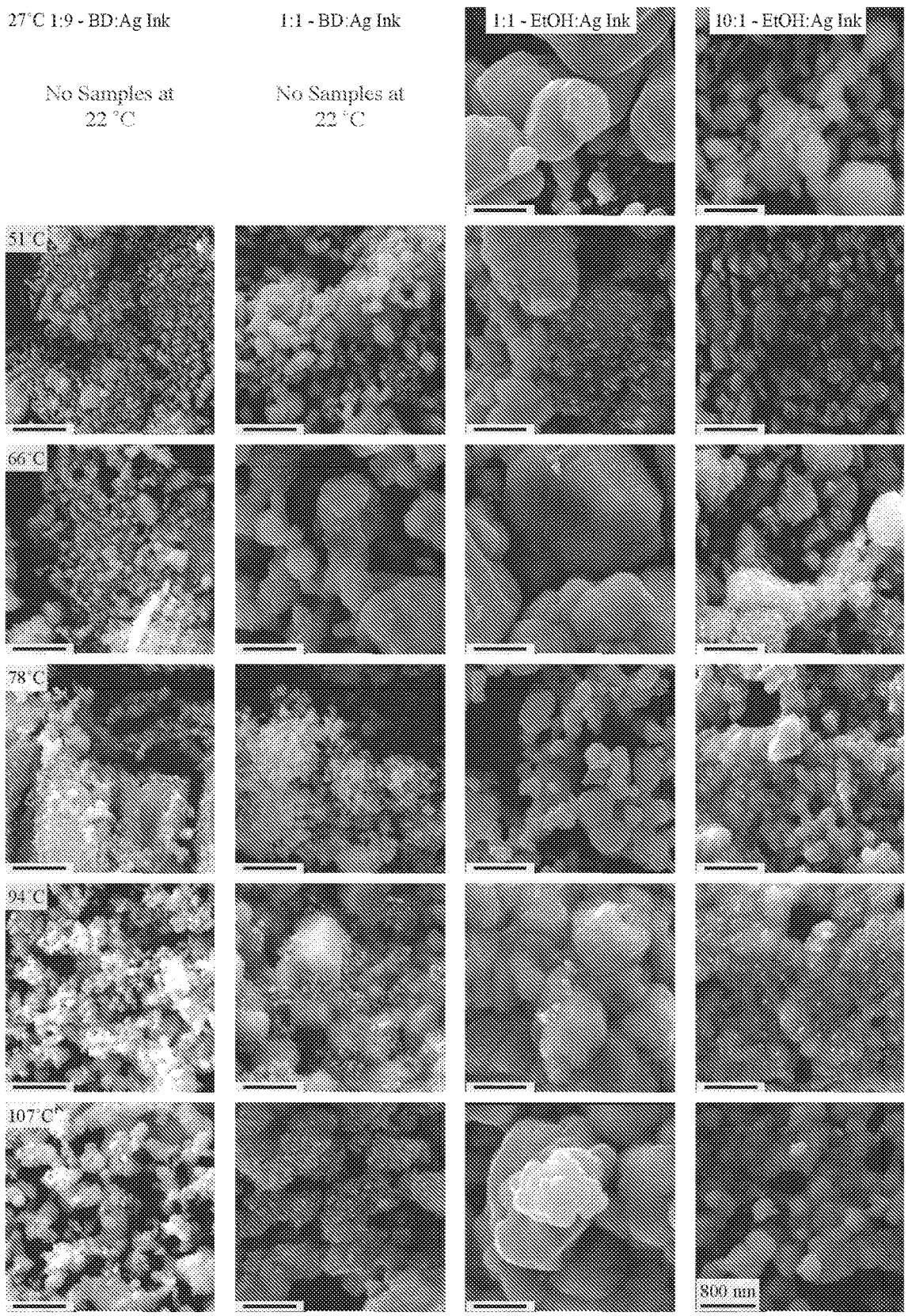
FIG. 36 shows top-down SEM micrographs at 25000× magnification (relative to the 4"×5" Polaroid standard) of inks printed at different substrate temperatures. Columns 1-4 are 1:9 BD:Ag Ink, 1:1 BD:Ag Ink, 1:1 EtOH:Ag Ink, and 10:1 EtOH:Ag ink respectively. Rows 1-6 are 22° C., 51° C., 66° C., 78° C., 94° C., and 107° C. respectively. All scale bars are 800 nm as indicated in the lower right micrograph.
Figure 37:
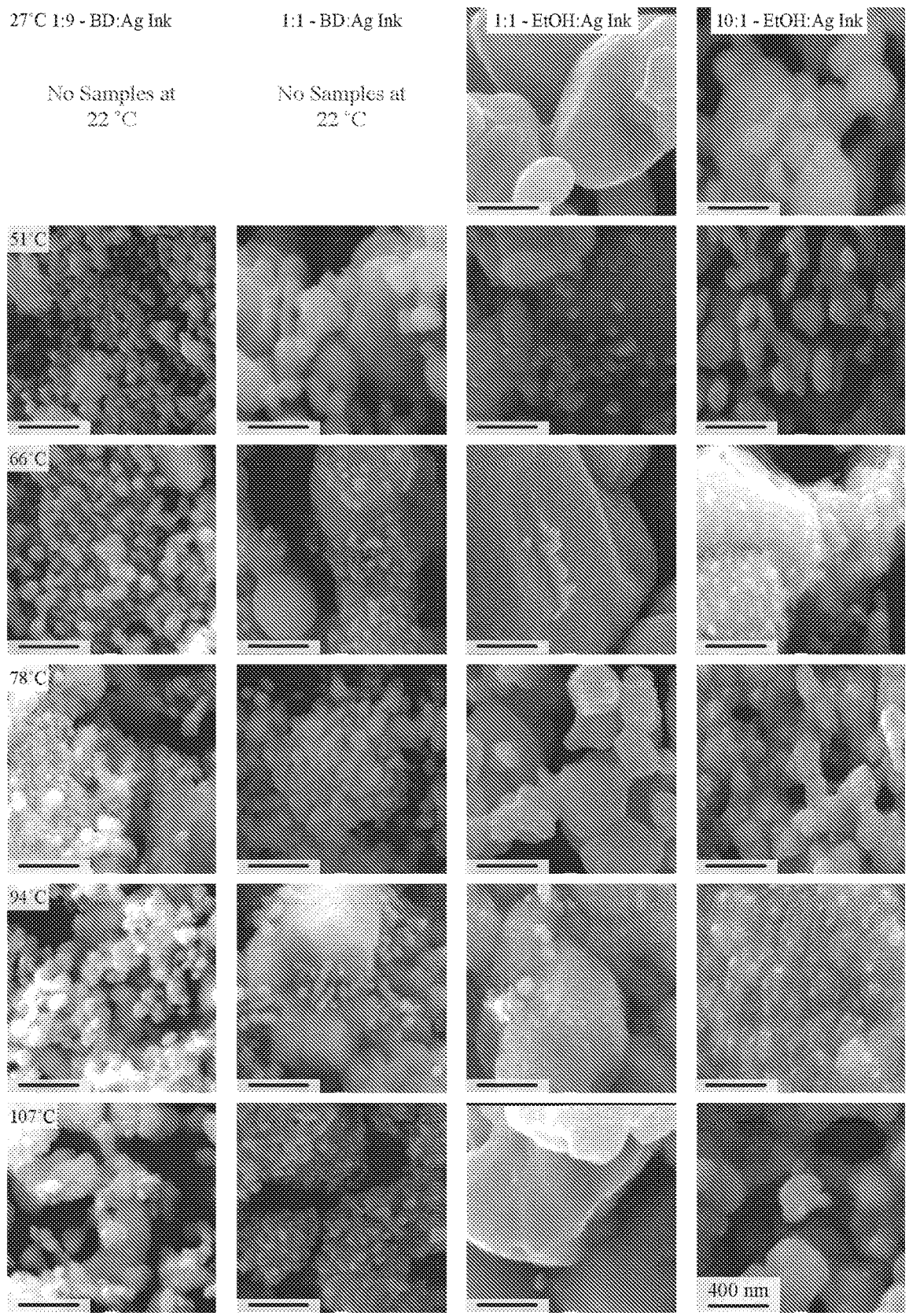
FIG. 37 shows top-down SEM micrographs at 50000× magnification (relative to the 4"×5" Polaroid standard) of inks printed at different substrate temperatures. Columns 1-4 are 1:9 BD:Ag Ink, 1:1 BD:Ag Ink, 1:1 EtOH:Ag Ink, and 10:1 EtOH:Ag ink respectively. Rows 1-6 are 22° C., 51° C., 66° C., 78° C., 94° C., and 107° C. respectively. All scale bars are 400 nm as indicated in the lower right micrograph.

The ethanol stabilized inks are less porous than the 2,3-butanediol stabilized inks, but the morphology between the 1:1-EtOH:Ag and the 10:1-EtOH:Ag inks are slightly different with the more concentrated 1:1-EtOH:Ag ink showing a more granular structure with less chemical sintering between particles until 94° C. (see FIG. 30).

At higher temperatures, the difference between the two stabilizing solvents becomes even more apparent. All the inks show increased porosity at high temperatures as the reduction reaction is pushed forward by both increased thermal energy and the increased reactant concentrations that occur as solvent evaporates at a faster rate. The 2,3-butanediol stabilized inks in particular form extremely large pockets where the low vapor pressure solvent was trapped. These morphology differences are well observed in the top-down and cross-section collages shown in the FIGS. 27-37. A characteristic "M" shape in porosity with a porosity minimum seen at 66° C. was observed for all inks except the 1:9-BD:Ag ink. It is believed that, at around 66° C., a balance is formed where fluid flow encourages particle aggregation and densification while particle nucleation and chemical sintering is small enough to minimize the formation of vapor trapping silver skins at the liquid/vapor interface.

The 10:1-EtOH:Ag ink consistently measured the lowest thickness ratio and porosity across all the substrate temperatures measured. The dramatic difference between the 1:1-EtOH:Ag ink and the more dilute 10:1-EtOH ink at 78 and 94° C. shows that particle nucleation and aggregation directly impact vapor entrapment at higher temperatures. The higher silver loading of the 1:1-EtOH:Ag ink will support increased particle nucleation, aggregation, chemical sintering, and vapor entrapment compared to the more dilute 10:1-EtOH:Ag ink. These temperatures are at or greater than the boiling point of ethanol (78° C.) and the ethanol will evaporate on the order of tens of milliseconds for the 15-20 pL 10:1-EtOH:Ag ink droplets. When compared to the significantly slower evaporating 2,3-butanediol inks, where evaporation time is estimated on the order of hundreds of milliseconds at 78° C., it is clear that increasing the solvent evaporation time can result in an a more porous structure. Although the exact mechanism for this difference is still under investigation, there are a number of likely phenomena that contribute to the dramatic increase in porosity and differences in morphology observed between the ethanol and the 2,3-butanediol stabilized inks. First, as the particles in reactive inks can chemically self-sinter within the evaporating droplet, the reduced contact angle and reduced evaporation time for the ethanol stabilized inks will reduce the formation of self-supporting aggregations. Second, the rate that reactant concentration increases and the rate that the stabilizing ammonia leaves the droplet will be significantly higher for the faster evaporating ethanol stabilized inks compared to the lower evaporating 2,3-butanediol inks. As a result, it is expected there would be smaller particles in the ethanol stabilized inks as the reaction is driven faster for increased nucleation and growth.

Figure 40:
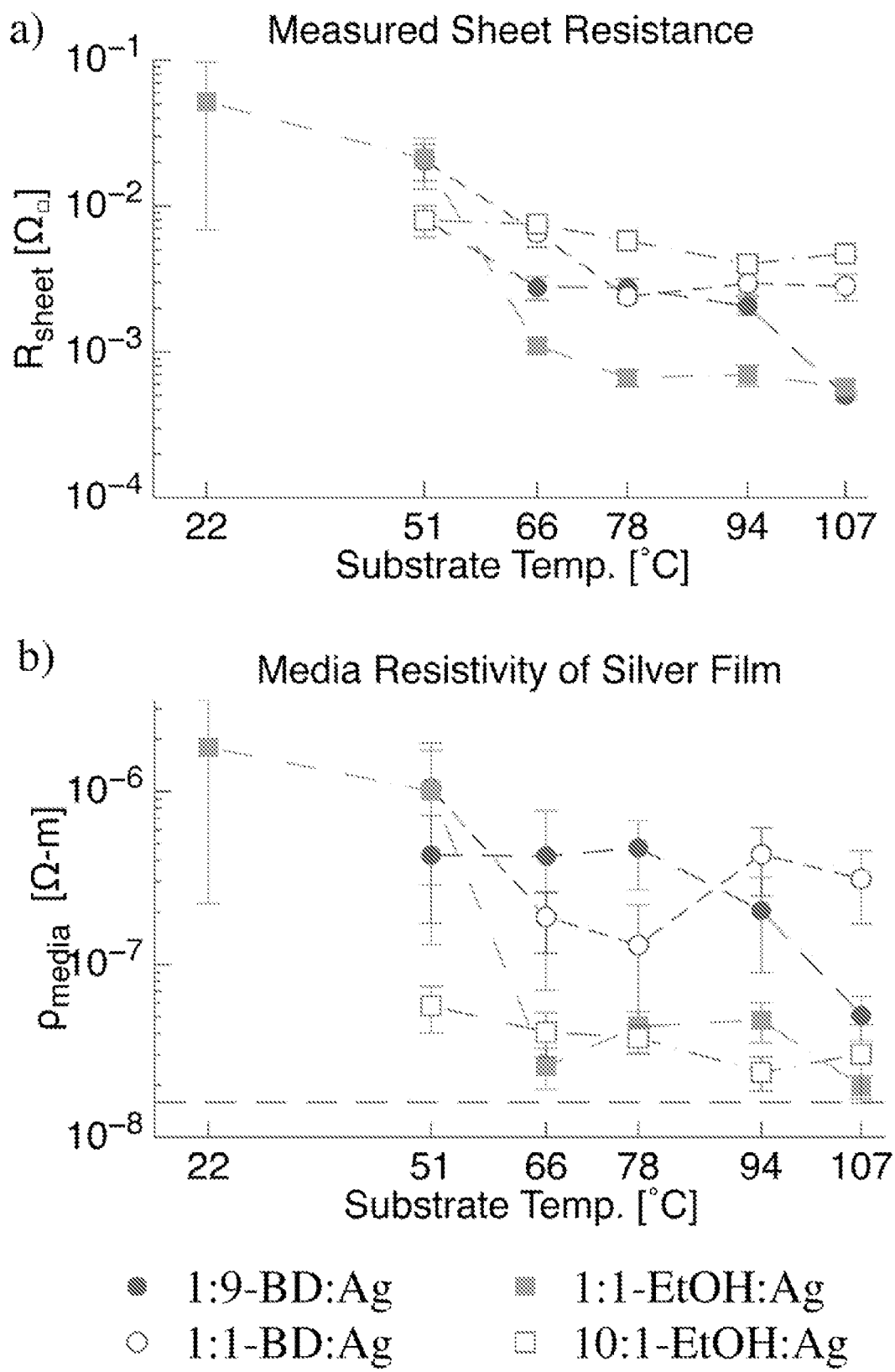
FIGS. 40A-B graphically illustrate the impact of substrate temperature on electrical sheet resistance for the four inks. (A) Measured sheet resistance. (B) Sheet resistance normalized by multiplying by the mean thickness. Resistivity of bulk silver is shown as a dashed gray line at 1.6 µΩm. Notice that sheet resistance decreases with increasing substrate temperatures for all inks except the 1:1-BD:Ag ink. Additionally, the EtOH diluted inks show lowest normalized sheet resistance and 1:1-EtOH:Ag ink the best measured sheet resistance.

FIG. 40 plots the 4-point mean measured sheet resistance, $R_s$, and the calculated media resistivity, $\rho_m$, of the silver films calculated using:

$$\rho_m = \frac{\pi}{\ln 2} \times t \times R_s \times R_1\left(\frac{b}{s}, \frac{a}{b}\right)$$

where t is the film thickness, $R_s$ is the measured sheet resistance, and $R_1$ is a geometric correction factor for a thin rectangular slice.

The dashed gray line in FIG. 40B is the bulk resistivity of silver. From FIG. 40A, it is clear that $R_s$ consistently decreases with increasing substrate temperature. The improved particle-to-particle contact seen in the SEM cross-section collages (FIG. 39) show that the lower sheet resistance arises from increased chemical and/or thermal sintering occurring at higher temperatures. The ethanol-stabilized inks consistently show both higher sintering levels and lower $\rho_m$, with both of these inks showing media resistivities near that of bulk silver. The 1:9-BD:Ag and 10:1-EtOH:Ag ink printed at 107° C. had the lowest $R_s$ at 0.5 mΩ; however, the 10:1-EtOH:Ag ink achieved this low sheet resistance with a 2 μm thick film while the 1:9-BD:Ag ink was 30 μm thick and extremely porous. Overall, the 10:1-EtOH:AG ink has the lowest resistivity at most temperatures and its low porosity should show the best long-term stability against electromigration and Joule heating; however, the low 2.6 wt. % Ag loading results in a very long print time for 1 μm thick films that, even though the media resistivity is low, will have higher sheet resistances compared to other films with equivalent amounts of silver. Depending on the application, a high concentration ink such as 1:1-EtOH:Ag could be a good compromise between print time, low sheet resistance, and low media resistivity.

Figure 41:
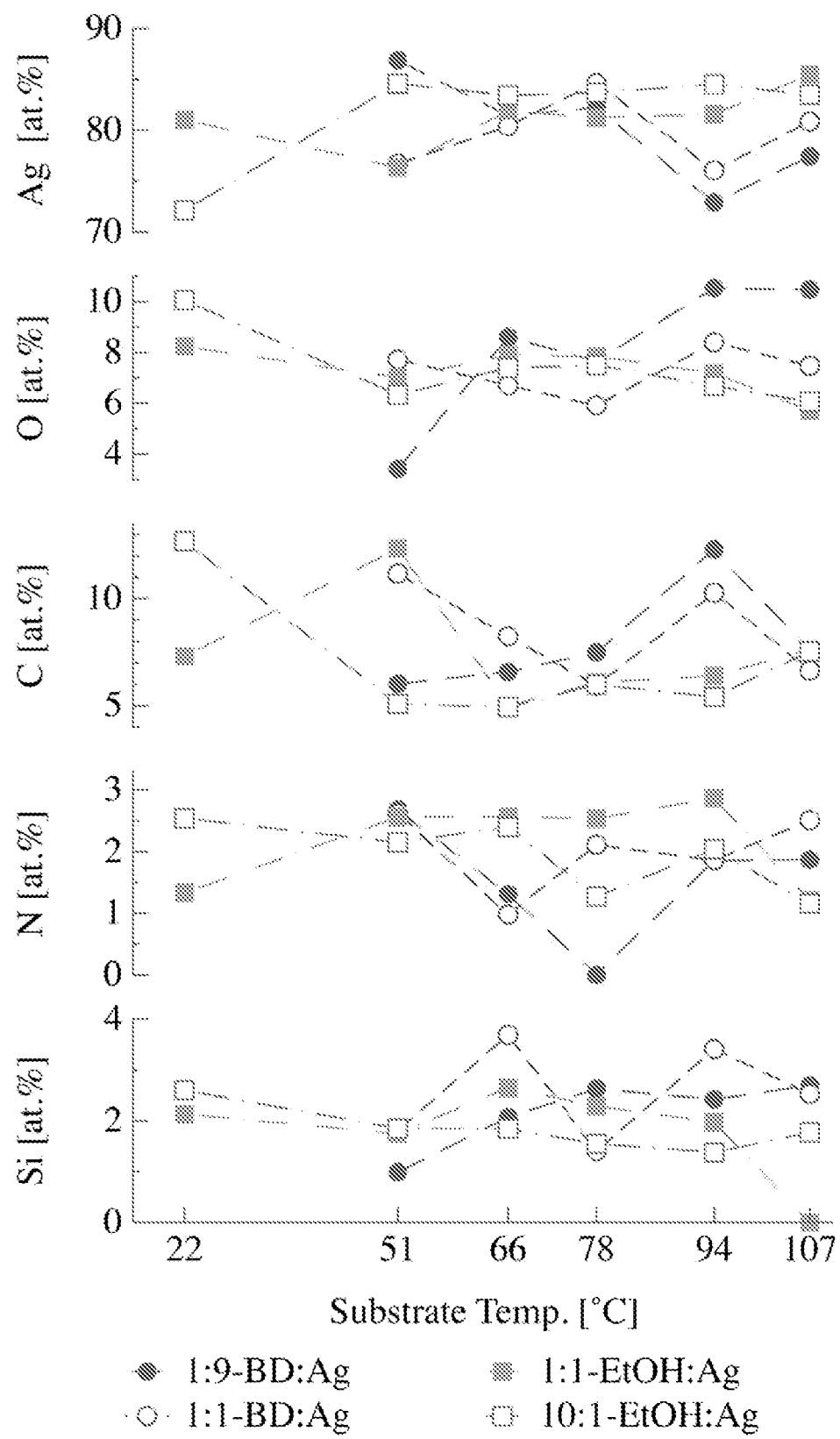
FIG. 41 graphically illustrates elemental composition from EDS for the four inks tested at various substrate temperatures. Notice that the oxygen content is consistently between 6-10 wt. %.

FIG. 41 plots the elemental composition in atomic percent versus temperature for the four inks at the substrate temperatures tested. The relatively high oxygen content is attributed to the porous nature of the printed films and surface oxidation that occurs between layers. As the oxygen and carbon contamination is relatively consistent across the inks and substrate temperatures tested, the differences in electrical performance are attributed to the morphology of the printed films and not to differences in oxidation or contamination.

In this example, it was determined that solvent type, diaminesilver (I) concentration, and substrate temperature dramatically impact the morphology and electrical properties of silver printed from silver-diamine inks. The four inks (1:9-BD:Ag, 1:1-BD:Ag, 1:1-EtOH:Ag, 10:1-EtOH:Ag by volume) were printed on glass substrates coated with a thin layer of tin (II) chloride as an adhesion layer at temperatures ranging from room temperature (~22° C.) to 107° C. In this example, solvent type had the most dramatic impact on morphology, with the more viscous, lower vapor pressure 2,3-butanediol stabilized inks producing more porous films with higher electrical media resistivities than the ethanol stabilized inks. The porosity of the films can be adjusted from 93% down to 52% by changing solvent type and substrate temperature. The lowest media resistivity was found for a 10:1-EtOH:Ag ink printed at 66° C. Overall, this example demonstrates that the porosity and resistivity of structures printed using self-reducing silver diamine inks varies dramatically with processing conditions. While previous work reported on the excellent resistivity of these inks, this is the first systematic study on the cross-sectional morphology of these printed structures. Additionally, this example shows that, by replacing standard humectants with lower vapor pressure solvents, the porosity and resistivity can be lowered when printing at slightly elevated temperatures and without the subsequent annealing step used by others.

Thus, the invention provides, among other things, a system and method for adjusting and controlling the morphology and porosity of reactive inks for manufacturing techniques that include dispensing printing processes and, in some implementations, methods and systems for manufacturing components, such as, for example, solar cell devices and components, using dispensing printing techniques to form patterns on a substrate. Various features and advantages of the invention are further illustrated in the accompanying drawings.

What is claimed is:

1. A system for printing metal on a substrate, the system comprising:
a temperature-controlled stage configured to hold the substrate and to maintain a temperature of the substrate at a target temperature, wherein the target temperature is greater than room temperature; and
a printer jet head having a nozzle to dispense a reactive metal ink and a solvent onto the substrate,
wherein the temperature-controlled stage is configured to control the temperature of the substrate during deposition of the reactive metal ink onto the substrate to produce a dense film in the absence of sintering.

2. The system of claim 1, wherein the reactive metal ink is a self-reducing silver-diamine ink.

3. The system of claim 2, wherein the solvent comprises ethanol or 2,3-butanediol.

4. The system of claim 3, wherein the temperature of the substrate is controlled to a range of between about 60° C. and about 80° C.

5. The system of claim 4, wherein electrical resistivity of the dense film is about 1 $\mu\Omega$cm to about 2 $\mu\Omega$cm.

6. The system of claim 4, wherein electrical resistivity of the dense film is about 1.8 $\mu\Omega$cm.

7. The system of claim 4, wherein porosity of the dense film is about 45% to about 55%.

8. The system of claim 4, wherein porosity of the dense film is about 50%.

9. The system of claim 3, wherein the temperature of the substrate is controlled to about 66° C.

10. The system of claim 1, wherein porosity of the dense film is reduced by at least 40% when the solvent comprises ethanol.

11. The system of claim 1, wherein media resistivity of the dense film is reduced by two orders of magnitude when the solvent is ethanol and the temperature of the substrate is 66° C.

12. The system of claim 11, wherein concentration of the reactive metal ink to the ethanol is 10 to 1.

13. The system of claim 1, wherein the nozzle includes an orifice having a diameter of equal to or less than 60 $\mu$m and a diamond-like coating to reduce wetting.

14. The system of claim 1, further comprising a camera positioned with a field of view including a surface of the temperature-controlled stage where the substrate is held during the deposition of the reactive metal ink onto the substrate, wherein the system is configured to adjust printing parameters by monitoring formation of droplets including the reactive metal ink and the solvent dispensed from the nozzle onto the substrate based on image data captured by the camera.

15. The system of claim 14, wherein the system is configured to adjust printing parameters by adjusting at least one selected from a group consisting of a solvent-to-ink ratio of the droplets dispensed by the nozzle and a temperature of the substrate.

16. The system of claim 1, further comprising:
a camera positioned with a field of view including a surface of the temperature-controlled stage where the substrate is held during the deposition of the reactive metal ink onto the substrate; and
a controller configured to
determine, based on image data from the camera, a contact angle of a droplet formed on the substrate, the droplet including the reactive metal ink and the solvent dispensed by the nozzle; and
adjust a solvent-to-ink ratio of droplets dispensed by the nozzle based on a comparison of the determined contact angle and a target contact angle.

17. A system of optimizing morphology and electrical properties of a reactive metal ink printed on a substrate, the system comprising:
a printer jet head having a nozzle to dispense droplets comprising a reactive metal ink and a solvent onto the substrate to produce a dense film in the absence of sintering;
a temperature-controlled stage configured to hold the substrate during dispensing of the droplets onto the substrate and to control a temperature of the substrate, wherein the temperature-controlled stage is configured to maintain the temperature of the substrate at a temperature between about 60° C. and about 80° C. during deposition of the reactive metal ink onto the substrate,
wherein a contact angle of a dispensed droplet relative to the substrate is less than 15°,
wherein a concentration of the solvent to reactive metal ink ranges between 1:1 and 10:1,
such that the dense film provides media resistivity less than 2 $\mu\Omega$cm with an optimized morphology with a porosity less than 60%.

18. The system of claim 17, wherein the solvent is ethanol or 2,3-butanediol, and wherein the reactive metal ink includes silver.

19. The system of claim 17, wherein the nozzle includes an orifice having a diameter of equal to or less than 60 $\mu$m and a diamond-like coating to reduce wetting.

20. The system of claim 17, wherein the reactive metal ink is silver.

21. The system of claim 17, further comprising:
a camera positioned with a field of view including a surface of the temperature-controlled stage where the substrate is held during the deposition of the droplets onto the substrate; and
a controller configured to
determine the contact angle of at least one dispensed droplet on the substrate based on image data from the camera; and
adjust a solvent-to-ink ratio of the droplets dispensed by the nozzle when the determined contact angle is greater than 15°.

* * * * *